(12) United States Patent
Bang et al.

(10) Patent No.: US 11,856,612 B2
(45) Date of Patent: Dec. 26, 2023

(54) METHOD AND APPARATUS FOR PERFORMING RANDOM ACCESS IN WIRELESS COMMUNICATION SYSTEM

(71) Applicant: Samsung Electronics Co., Ltd., Gyeonggi-do (KR)

(72) Inventors: Jonghyun Bang, Gyeonggi-do (KR); Jinyoung Oh, Gyeonggi-do (KR); Hyunseok Ryu, Gyeonggi-do (KR); Sungjin Park, Gyeonggi-do (KR); Cheolkyu Shin, Gyeonggi-do (KR); Jeongho Yeo, Gyeonggi-do (KR)

(73) Assignee: Samsung Electronics Co., Ltd

( * ) Notice: Subject to any disclaimer, the term of this patent is extended or adjusted under 35 U.S.C. 154(b) by 400 days.

(21) Appl. No.: 17/418,108

(22) PCT Filed: Feb. 12, 2020

(86) PCT No.: PCT/KR2020/001945
§ 371 (c)(1),
(2) Date: Jun. 24, 2021

(87) PCT Pub. No.: WO2020/166954
PCT Pub. Date: Aug. 20, 2020

(65) Prior Publication Data
US 2022/0104265 A1 Mar. 31, 2022

(30) Foreign Application Priority Data

Feb. 14, 2019 (KR) .................. 10-2019-0017349

(51) Int. Cl.
*H04W 74/04* (2009.01)
*H04W 74/08* (2009.01)
(52) U.S. Cl.
CPC .............. *H04W 74/0833* (2013.01)

(58) Field of Classification Search
CPC ................................. H04W 74/0833
See application file for complete search history.

(56) References Cited

U.S. PATENT DOCUMENTS 10,123,350 B2 * 11/2018 Ye ................ H04W 74/0833
10,420,135 B2 *  9/2019 Yang ................ H04L 5/0053
(Continued)

FOREIGN PATENT DOCUMENTS

| KR | 10-2018-0108595 | 10/2018 |
| KR | 10-2019-0129647 | 11/2019 |
| KR | 10-2020-0015284 | 2/2020 |

OTHER PUBLICATIONS

PCT/ISA/210 Search Report issued on PCT/KR2020/001945, dated May 25, 2020, pp. 5.
(Continued)

*Primary Examiner* — Dai Phuong
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention relates to a method and an apparatus for performing random access in a wireless communication system. More specifically, proposed is a method of, when a terminal intends to perform random access through multiple PRACH preamble transmission in an unlicensed band, determining whether to change or reset a CP (Continued)

length of a channel access procedure gap or a PRACH preamble according to the number of multiple PRACH preamble transmissions.

15 Claims, 13 Drawing Sheets

(56) References Cited

U.S. PATENT DOCUMENTS

| | | | |
|---|---|---|---|
| 2016/0302076 A1* | 10/2016 | Chou | H04W 52/0225 |
| 2017/0006547 A1* | 1/2017 | Fujishiro | H04W 52/0206 |
| 2018/0103458 A1 | 4/2018 | Tooher et al. | |
| 2019/0014598 A1 | 1/2019 | Yoshimura et al. | |
| 2019/0246428 A1* | 8/2019 | Yoon | H04W 16/14 |
| 2020/0045738 A1 | 2/2020 | Oh et al. | |

OTHER PUBLICATIONS

PCT/ISA/237 Written Opinion issued on PCT/KR2020/001945, dated May 25, 2020, pp. 5.

Samsung, 'Discussion on multiple Msg.1 transmission procedure', R1-1901041, 3GPP TSG RAN WG1 Ad-Hoc Meeting 1901, Taipei, Taiwan, Jan. 11, 2019, pp. 5.

Mediatek Inc., 'Random access backoff and timers in NR-U', R2-1816688, 3GPP TSG-RAN WG2 Meeting #104, Spokane, US, Nov. 1, 2018, pp. 5.

LG Electronics, 'Initial access and mobility for NR-U', R1-1900607, 3GPP TSG RAN WG1 Ad-Hoc Meeting 1901, Taipei, Taiwan, Jan. 12, 2019, pp. 20.

* cited by examiner

METHOD AND APPARATUS FOR PERFORMING RANDOM ACCESS IN WIRELESS COMMUNICATION SYSTEM

PRIORITY

This application is a National Phase Entry of PCT International Application No. PCT/KR2020/001945 which was filed on Feb. 12, 2020, and claims priority to Korean Patent Application No. 10-2019-0017349, which was filed on Feb. 14, 2019, the content of each of which is incorporated herein by reference.

TECHNICAL FIELD

The disclosure relates to a method and device for performing random access in a wireless communication system. More specifically, in a wireless communication system, in particular, in a node receiving a downlink signal or a system and node that want to transmit an uplink signal in an unlicensed band, when it is intended to perform random access through transmission of multiple physical random access channel (PRACH) preambles, the disclosure relates to a method of setting a channel access procedure gap for access to an unlicensed band.

BACKGROUND ART

In order to meet the demand for wireless data traffic explosively increasing due to the commercialization of 4G communication systems and the increase in multimedia services, an improved 5G communication system or a pre-5G communication system is being developed. For this reason, a 5G communication system or a pre-5G communication system is referred to as a beyond 4G network communication system or a post LTE system.

In order to increase a data transmission rate, consideration is being given to implementing the 5G communication system in a mmWave band (e.g., 60 GHz band). In order to mitigate a route loss of electronic waves in a mmWave band and to increase transmission distances of electronic waves, the technologies of beamforming, massive multiple input and output (MIMO), full dimensional MIMO (FD-MIMO), array antenna, analog beamforming, and large scale antenna have been discussed for the 5G communication system.

Further, To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

The disclosure relates to a method and device for performing random access in a wireless communication system. In particular, an embodiment of the disclosure provides a method of determining a length of a PRACH preamble and a channel access procedure gap in an unlicensed band according to the number of PRACH preamble transmissions, when transmitting multiple PRACH preambles in order to perform random access in a node receiving a downlink signal in the unlicensed band or a system and node that want to transmit an uplink signal.

Solution to Problem

According to an embodiment of the disclosure, a method performed by a terminal includes receiving configuration information for transmission of multiple random access preambles from a base station; transmitting a first random access preamble based on the configuration information for transmission of the multiple random access preambles; adjusting at least one of a length of a channel access procedure gap for a second random access preamble or a length of a random access channel transmission interval based on transmission of the first random access preamble; and attempting channel access for transmission of the second random access preamble in the channel access procedure gap based on adjustment of at least one of the length of the channel access procedure gap or the length of the random access channel transmission interval.

According to an embodiment of the disclosure, a terminal includes a transceiver; and a controller configured to control to receive configuration information for transmission of multiple random access preambles from a base station through the transceiver, to transmit a first random access preamble based on the configuration information for transmission of the multiple random access preambles through the transceiver, to adjust at least one of a length of a channel access procedure gap or a length of a random access channel transmission interval for a second random access preamble based on transmission of the first random access preamble, and to attempt channel access for transmission of the second random access preamble in the channel access procedure gap based on adjustment of at least one of the length of the channel access procedure gap or the length of the random access channel transmission interval.

According to an embodiment of the disclosure, a method performed by a base station includes transmitting configuration information for transmission of multiple random access preambles to a terminal; receiving a first random access preamble from the terminal based on the configuration information for transmission of the multiple random access preambles; and receiving a second random access preamble from the terminal, wherein at least one of a length of a channel access procedure gap or a length of a random access channel transmission interval for the second random access preamble is adjusted based on transmission of the first random access preamble.

According to an embodiment of the disclosure, a base station includes a transceiver; and a controller configured to control to transmit configuration information for transmission of multiple random access preambles to a terminal through the transceiver, to receive a first random access preamble from the terminal through the transceiver based on the configuration information for transmission of the multiple random access preambles, and to receive a second random access preamble from the terminal through the transceiver, wherein at least one of a length of a channel access procedure gap or a length of a random access channel transmission interval for the second random access preamble is adjusted based on transmission of the first random access preamble.

Advantageous Effects of Invention

According to an embodiment of the disclosure, a method and device for performing random access in a wireless communication system can be provided.

Further, according to an embodiment of the disclosure, in a wireless communication system, in particular, when performing random access using multiple PRACH preamble transmission in a system and node that transmit and receive signals through an unlicensed band, by changing the channel access procedure gap using information on the number of PRACH preamble transmissions, the probability of success of random access of the system and node is improved; thus, the unlicensed band can be used more efficiently.

MODE FOR THE INVENTION

Figure 1:
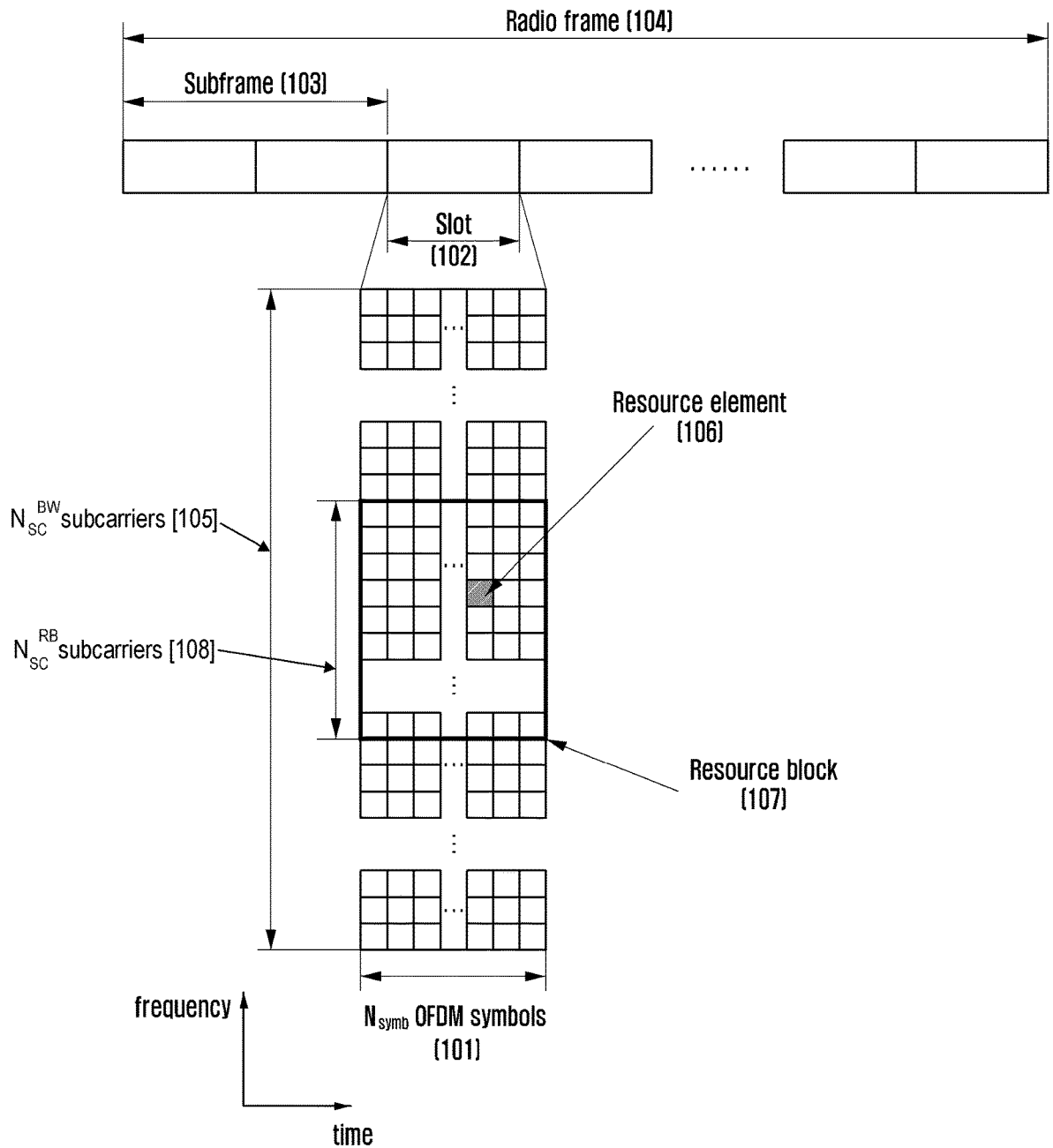
FIG. 1 is a diagram illustrating a transmission structure in time and frequency domains of an uplink or a downlink of an NR system according to an embodiment of the disclosure.

Hereinafter, embodiments of the disclosure will be described in detail with reference to the accompanying drawings.

When describing an embodiment, a description of technical contents well known in the art of the disclosure and not directly related to the disclosure will be omitted. This is to more clearly convey the gist of the disclosure without obscuring the subject matter by omitting unnecessary description.

Similarly, in the attached drawings, some components are illustrated in an exaggerated or schematic form or are omitted. Further, a size of each component does not entirely reflect an actual size. In each drawing, the same reference numerals are assigned to the same or corresponding components.

Advantages and features of the disclosure, and a method of achieving them will be apparent with reference to the embodiments described below in detail together with the accompanying drawings. However, the disclosure is not limited to embodiments disclosed below, but may be implemented in various different forms. The present embodiments enable the complete disclosure of the disclosure and are provided to fully notify the scope of the disclosure to those skilled in the art, and the disclosure is defined by the scope of the claims. The same reference numerals refer to the same components throughout the specification.

In this case, it may be understood that each block of a flowchart and combinations of the flowchart may be performed by computer program instructions. Because these computer program instructions may be mounted in a processor of a universal computer, a special computer, or other programmable data processing equipment, the instructions performed through a processor of a computer or other programmable data processing equipment generate a means that performs functions described in a block(s) of the flowchart. In order to implement a function with a specific method, because these computer program instructions may be stored at a computer available or computer readable memory that can direct a computer or other programmable data processing equipment, instructions stored at the computer available or computer readable memory may enable to produce a production item including an instruction means that performs a function described in block(s) of the flowchart. Because computer program instructions may be mounted on a computer or other programmable data processing equipment, a series of operation steps are performed on the computer or other programmable data processing equipment and generate a process executed with the computer, and instructions that direct the computer or other programmable data processing equipment may provide steps for executing functions described in block(s) of the flowchart.

Further, each block may represent a portion of a module, segment, or code including at least one executable instruction for executing a specific logical function(s). Further, in several replaceable execution examples, it should be noted that functions described in blocks may be performed regardless of order. For example, two consecutively illustrated blocks may be substantially simultaneously performed or may be sometimes performed in reverse order according to a corresponding function.

In this case, a term '-unit' used in the present embodiment means software or a hardware component such as a field programmable gate array (FPGA) or an application specific integrated circuit (ASIC) and performs any function. However, "-unit" is not limited to software or hardware. "-unit" may be configured to store at a storage medium that can address and be configured to reproduce at least one processor. Therefore, "-unit" includes, for example, components such as software components, object-oriented software components, class components, and task components, processes, functions, attributes, procedures, subroutines, segments of a program code, drivers, firmware, microcode, circuit, data, database, data structures, tables, arrays, and variables. A function provided within components and "-units" may be performed by coupling the smaller number of components and "-units" or by subdividing the components and "-units" into additional components and "-units". Further, components and "-units" may be implemented to reproduce at least one CPU within a device or a security multimedia card. Further, in an embodiment, '-unit' may include at least one processor.

A 5G system is considering supporting various services compared to the existing 4G system. For example, the most representative services may include an enhanced mobile broad band (eMBB) service, an ultra-reliable and low latency communication (URLLC) service, a massive machine type communication (mMTC) service, an evolved multimedia broadcast/multicast service (eMBMS), and the like. A system providing the URLLC service may be referred to as a URLLC system, and a system providing an eMBB service may be referred to as an eMBB system. Further, the terms 'service' and 'system' may be used interchangeably.

In this way, in a communication system, a plurality of services may be provided to a user, and in order to provide such a plurality of services to users, a method of providing each service within the same time period according to characteristics and a device using the same are required.

In a wireless communication system, for example, an LTE or LTE-A system, or a 5G new radio (NR) system, by transmitting downlink control information (DCI) including resource allocation information for transmitting a downlink signal transmitted from a base station to a terminal through a physical downlink control channel (PDCCH), the wireless communication system may be configured to receive downlink signals of at least one of downlink control information (e.g., channel-state information reference signal (CSI-RS)), a physical broadcast channel ((PBCH), or a physical downlink shared channel (PDSCH)) to the terminal. For example, the base station may transmit DCI instructing to the terminal to receive the PDSCH through the PDCCH in the subframe n, and the terminal that has received the DCI receives the PDSCH in the subframe n according to the received downlink control information. Further, in the LTE, LTE-A, or NR system, the base station may transmit DCI including uplink resource allocation information to the terminal through a PDCCH to set so that the terminal transmits an uplink signal of at least one of uplink control information (e.g., a sounding reference signal (SRS), uplink control information (UCI), a physical random access channel (PRACH), or a physical uplink shared channel (PUSCH)) to the base station. For example, the terminal that has received uplink transmission configuration information (or uplink DCI or UL grant) transmitted from the base station through the PDCCH in a subframe n may perform uplink data channel transmission (hereinafter, PUSCH transmission) according to a pre-defined time (e.g., n+4), a time (e.g., n+k) set through a higher signal, or uplink signal transmission time indicator information (e.g., n+k) included in the uplink transmission configuration information.

When the preset downlink transmission is transmitted from the base station to the terminal through the unlicensed band or when the preset uplink transmission is transmitted from the terminal to the base station through the unlicensed band, the transmitting device (base station or terminal) performs a channel access procedure (or listen-before talk (LBT)) for an unlicensed band in which the signal transmission is configured before or immediately before a preset signal transmission start time point, and according to the execution result of the channel access procedure, when it is determined that the unlicensed band is in an idle state, the transmitting device may access the unlicensed band to perform the preset signal transmission. When it is determined that the unlicensed band is not idle or occupied according to the channel access procedure performed by the transmitting device, the transmitting device cannot access the unlicensed band; thus, the transmitting device cannot perform transmission of the preset signal.

In a channel access procedure in the unlicensed band configured to transmit the signal, the transmitting device may generally receive the signal in the unlicensed band during a predetermined time or a time calculated according to a predefined rule (e.g., a time calculated through at least one random value selected by the base station or the terminal) and compare the strength of the received signal with a threshold value defined in advance or calculated by a function configured with at least one variable of a channel bandwidth or a bandwidth of a signal to be transmitted, strength of transmission power, a beam width of a transmission signal and the like to determine an idle state of the unlicensed band. For example, when the strength of a signal received during 25 us is less than a predefined threshold value of −72 dBm, the transmitting device determines that the unlicensed band is in an idle state and may transmit a preset signal. In this case, the maximum possible time of signal transmission may be limited according to the maximum channel occupancy time defined for each country or region in the unlicensed band, or the type of a transmission device (e.g., a base station or a terminal, or a master device or a slave device). For example, in the case of Japan, in an unlicensed band of 5 GHz, by occupying a channel without performing an additional channel access procedure for a maximum time of 4 ms after performing the channel access procedure, the base station or the terminal may transmit a signal. When the strength of the signal received during 25 us is greater than a predefined threshold value −72 dBm, the base station determines that the unlicensed band is not in an idle state, and does not transmit a signal.

In the case of a 5G communication system, in order to provide various services and support a high data rate, various technologies such as retransmission of a code block group (CBG) unit and technology capable of transmitting an uplink signal without uplink scheduling information have been introduced. Therefore, in the case of performing 5G communication through an unlicensed band, a more efficient channel access procedure in consideration of various variables is required.

The wireless communication system is evolving from an initial voice-oriented service to a broadband wireless communication system that provides high-speed and high-quality packet data services as in communication standards such as high speed packet access (HSPA), long term evolution (LTE or evolved universal terrestrial radio access (E-UTRA)), and LTE-advanced (LTE-A) of 3GPP, high rate packet data (HRPD) of 3GPP2, ultra mobile broadband (UMB), and 802.16e of IEEE. Further, as a 5th generation wireless communication system, a communication standard of 5G or new radio (NR) is being made.

In this way, in a wireless communication system including the 5th generation, at least one service of enhanced mobile broadband (eMBB), massive machine type communications (mMTC), or ultra-reliable and low-latency communications (URLLC) may be provided to the terminal. The services may be provided to the same terminal during the same time period. In an embodiment, eMBB may be a service for high-speed transmission of high-capacity data, mMTC may be a service aiming at minimizing terminal power and accessing multiple terminals, and URLLC may be a service aiming at high reliability and low latency, but they are not limited thereto. The three services may be a major scenario in an LTE system or a system such as 5G/NR (new radio, next radio) after LTE.

When the base station schedules data corresponding to the eMBB service to a certain terminal in a specific transmission time interval (TTI), if a situation occurs in which URLLC data should be transmitted in the TTI, in a frequency band in which the eMBB data is already scheduled and being transmitted, the base station may not transmit a part of the eMBB data, but may transmit the generated URLLC data in the frequency band. The terminal in which eMBB data is scheduled and the terminal in which URLLC data is scheduled may be the same terminal or different terminals. In such a case, because a part of the eMBB data that has already been scheduled and being transmitted may not be transmitted, the possibility of damage in the eMBB data increases. Therefore, in the above case, it is necessary to determine a method in which a terminal in which eMBB data is scheduled or a terminal in which URLLC data is scheduled processes a received signal and a method of receiving a signal.

Terms to be described later are terms defined in consideration of functions in the disclosure, which may vary according to the intention or custom of users or operators. Therefore, the definition should be made based on the contents throughout the present specification. Hereinafter, the base station is a subject that performs resource allocation of the terminal, and may be at least one of an enode B (eNB), a node B, a base station (BS), a gNB, a radio access unit, a base station controller, or a node on a network. The terminal may include a user equipment (UE), a mobile station (MS), a cellular phone, a smart phone, a computer, a vehicle, or a multimedia system capable of performing a communication function. In the disclosure, a downlink (DL) refers to a radio transmission path of a signal transmitted from a base station to a terminal, and an uplink (UL) refers to a radio transmission path of a signal transmitted from the terminal to the base station. Further, hereinafter, an embodiment of the disclosure will be described using an LTE or LTE-A system as an example, but the embodiment of the disclosure may be applied to other communication systems having a similar technical background or channel type. For example, 5G mobile communication technology (5G, new radio, NR) developed after LTE-A may be included therein. Further, the embodiments of the disclosure may be applied to other communication systems through some modifications without significantly departing from the scope of the disclosure, as determined by a person having skilled technical knowledge.

As a representative example of the broadband wireless communication system, in the NR system, the downlink (DL) employs an orthogonal frequency division multiplexing (OFDM) scheme, and the uplink (UL) employs OFDM and single carrier frequency division multiple access (SC-FDMA) scheme. The uplink refers to a radio link in which the terminal transmits data or control signals to the base station, and the downlink refers to a radio link in which the base station transmits data or control signals to the terminal. In the multiple access scheme as above described, it is possible to distinguish data or control information of each user by allocating and operating time-frequency resources to carry data or control information for each user so that they do not overlap with each other, that is, orthogonality is established.

When a decoding failure occurs in initial transmission, the NR system employs a hybrid automatic repeat request (HARQ) scheme in which a physical layer retransmits the corresponding data. In the HARQ scheme, when a receiver fails to accurately decode data, the receiver transmits negative acknowledgement (NACK) notifying a transmitter of the decoding failure so that the transmitter may retransmit the corresponding data in the physical layer. By combining the data retransmitted by the transmitter with data in which decoding has been previously failed, the receiver improves a data reception performance. Further, when the receiver correctly decodes data, the receiver may transmit acknowledgement (ACK) notifying the transmitter of decoding success to enable the transmitter to transmit new data.

FIG. 1 is a diagram illustrating a basic structure of a time-frequency domain, which is a radio resource domain in which the data or control channel is transmitted in an uplink/downlink of an NR system or a similar system according to an embodiment of the disclosure.

Referring to FIG. 1, a horizontal axis represents a time domain resource and a vertical axis represents a frequency domain resource. A minimum transmission unit in the time domain resource is an OFDM to DFT-s-OFDM symbol, and the $N_{symb}$ number of OFDM to DFT-s-OFDM symbols 101 are gathered to form one slot 102. Here, the OFDM symbol is a symbol of a case of transmitting and receiving a signal using an OFDM multiplexing method, and the DFT-s-OFDM symbol is a symbol of a case of transmitting and receiving a signal using a DFT-s-OFDM or SC-FDMA multiplexing method. Hereinafter, in various embodiments of the disclosure, for convenience of description, OFDM and DFT-s-OFDM symbols will be commonly described as OFDM symbols without distinction of a symbol, and will be described based on downlink signal transmission and reception, but they will be applicable to uplink signal transmission and reception.

When an interval between subcarriers is 15 kHz, one slot is gathered to form one subframe 103, and each of lengths of the slots and subframes is 1 ms. In this case, the number and length of slots constituting one subframe 103 may be different according to the interval between subcarriers. For example, when the interval between subcarriers is 30 kHz, two slots may be gathered to form one subframe 103. In this case, the length of the slot is 0.5 ms and the length of the subframe is 1 ms. A radio frame 104 is a time domain resource section configured with 10 subframes. A minimum transmission unit in the frequency domain resource is a subcarrier, and a bandwidth of an entire system transmission band is configured with the total $N_{sc}^{BW}$ number of subcarriers 105. However, such specific numerical values may be applied variably. For example, in the case of the LTE system, the interval between subcarriers is 15 kHz, but two slots are gathered to form one subframe 103, and in this case, the length of the slot is 0.5 ms and the length of the subframe is 1 ms.

A basic unit of a resource in the time-frequency domain resource is a resource element (RE) 106, which may be represented by an OFDM symbol index and a subcarrier index. A resource block ((RB) or physical resource block (PRB)) 107 may be defined as the $N_{symb}$ number of consecutive OFDM symbols 101 in the time domain resource and the $N_{sc}^{RB}$ number of consecutive subcarriers 108 in the frequency domain resource. Therefore, one RB 107 in one slot may include the $N_{symb} \times N_{SC}^{RB}$ number of REs. In general, the minimum allocation unit in the frequency domain resource of data is the RB 107. In an NR system, in general, $N_{symb}=14$ and $N_{SC}^{RB}=12$, and the number ($N_{RB}$) of RBs may vary according to the bandwidth of the system transmission band. In the LTE system, in general, $N_{symb}=7$ and $N_{SC}^{RB}=12$, and the $N_{RB}$ may vary according to the bandwidth of the system transmission band.

Downlink control information may be transmitted within the first N number of OFDM symbols in the subframe. In general, N may be {1, 2, 3}, and the UE may receive the number of symbols in which the downlink control information may be transmitted from the base station through a higher signal. Further, according to an amount of control information to be transmitted in a current slot, the base station may vary the number of symbols in which downlink control information may be transmitted in the slot for each slot, and transmit information on the number of symbols to the UE through a separate downlink control channel.

In the NR to LTE system, scheduling information on downlink data or uplink data may be transmitted from the base station to the UE through downlink control information (DCI). DCI is defined according to various formats and may represent whether it is scheduling information (UL grant) for uplink data or scheduling information (DL grant) for downlink data according to each format, and whether it is compact DCI with a small size of control information, whether the control information is fall-back DCI, whether spatial multiplexing using multiple antennas is applied, whether it is DCI for power control, and the like. For example, a DCI format (e.g., DCI format 1_0 of NR), which is scheduling control information (DL grant) on downlink data may include at least one of the following control information.

DCI format identifier: Identifier that identifies a format of the received DCI

Frequency domain resource assignment: indicate an RB assigned to data transmission.

Time domain resource assignment: indicate slots and symbols assigned to data transmission.

VRB-to-PRB mapping: indicate whether to apply a VRB mapping method

Modulation and coding scheme (MCS): indicate a modulation method used for data transmission and a size of a transport block, which is data to be transmitted.

New data indicator: indicate whether HARQ initial transmission or retransmission.

Redundancy version: indicate a redundancy version of HARQ.

HARQ process number: indicate the process number of HARQ.

PDSCH allocation information (Downlink assignment index): indicate the number (e.g., HARQ-ACK number) of PDSCH reception results to be reported to the base station to the UE Transmit power control (TPC) command for a physical uplink control channel (PUCCH): indicate a transmit power control command for a PUCCH, which is an uplink control channel.

PUCCH resource indicator: indicate a PUCCH resource used for HARQ-ACK report including a reception result for a PDSCH set through the corresponding DCI PUCCH transmission timing indicator (PDSCH-to-HARQ_feedback timing indicator): indicate slot or symbol information in which a PUCCH for HARQ-ACK report including a reception result for the PDSCH set through the corresponding DCI should be transmitted The DCI may be transmitted on an enhanced PDCCH (EPDCCH) (or enhanced control information, hereinafter, it is used interchangeably) or a physical downlink control channel (PDCCH) (or control information, hereinafter, it is used interchangeably), which is a downlink physical control channel through channel coding and modulation processes.

In general, the DCI is scrambled with a specific radio network temporary identifier (RNTI) (or UE identifier C-RNTI) independently for each UE to add a cyclic redundancy check (CRC), and is configured with each independent PDCCH and transmitted after channel coding. In the time domain resource, the PDCCH is mapped and transmitted during the control channel transmission interval. A frequency domain resource mapping position of the PDCCH may be determined by an identifier (ID) of each UE, and be spread in the entire system transmission band and transmitted.

Downlink data may be transmitted on a physical downlink shared channel (PDSCH), which is a physical channel for downlink data transmission. The PDSCH may be transmitted after the control channel transmission interval, and scheduling information such as a specific mapping position and modulation scheme in the frequency domain resource is determined based on the DCI transmitted through the PDCCH.

The base station notifies the UE of a modulation scheme applied to the PDSCH to be transmitted to the UE and a size (transport block size (TBS)) of data to be transmitted through the MCS among the control information constituting the DCI. In an embodiment, the MCS may be configured with 5 bits or more or less bits. The TBS corresponds to a size before channel coding for error correction is applied to data (transport block (TB)) to be transmitted by the base station.

Modulation methods supported by the NR system are quadrature phase shift keying (QPSK), quadrature amplitude modulation (16QAM), 64QAM, and 256QAM, and each modulation order (Qm) thereof is 2, 4, and 6. That is, in the case of QPSK modulation, 2 bits per symbol may be transmitted, in the case of 16QAM modulation, 4 bits per symbol may be transmitted, in the case of 64QAM modulation, 6 bits per symbol may be transmitted, and in the case of 256QAM modulation, 8 bits per symbol may be transmitted. Further, a modulation scheme of 256QAM or more may be used according to system modifications.

In the NR system, the uplink/downlink HARQ employs an asynchronous HARQ scheme in which a data retransmission time point is not fixed. When describing the downlink as an example, when HARQ NACK feedback is received from the UE for initial transmission data transmitted by the base station, the base station freely determines a transmission time point of retransmission data by a scheduling operation. For a HARQ operation, the UE may buffer data determined to an error as a decoding result of received data, and then perform combining with data retransmitted from the base station. HARQ ACK/NACK information of a PDSCH transmitted in a subframe n-k may be transmitted from the UE to the base station through a PUCCH or PUSCH in a subframe n. In the case of a 5G communication system such as NR, the k value may be included and transmitted in the DCI instructing or scheduling reception of the PDSCH transmitted in the subframe n-k, or the k value may be configure to the UE through a higher signal. In this case, the base station may configure one or more k values as higher signals and indicate a specific k value through the DCI. In this case, the k may be determined according to a HARQ-ACK processing capability of the UE, that is, the minimum time required for the UE to receive the PDSCH and to generate and report HARQ-ACK for the PDSCH. Further, the UE may use a predefined value or a default value until the k value is configured.

Although the description of the wireless communication system and the method and device proposed in the embodiment of the disclosure have been described based on the NR system, the contents of the disclosure are not limited to the NR system, but may be applied to various wireless communication systems such as LTE, LTE-A, and LTE-A-Pro and 5G. Further, the contents of the disclosure are described based on a system and a device for transmitting and receiving signals using an unlicensed band, but the contents of the disclosure may be applied to a system operating in a licensed band.

Hereinafter, in the disclosure, higher layer signaling or a higher signal is a signal transmission method transmitted from the base station to the UE using a downlink data channel of the physical layer or from the UE to the base station using an uplink data channel of the physical layer and includes a signal transmission method transmitted through radio resource control (RRC) signaling, packet data convergence protocol (PDCP) signaling, or a medium access control (MAC) control element (MAC CE). Further, system information, for example, a system information block (SIB) commonly transmitted to a plurality of UEs may be included in the higher signaling or higher signal.

In the case of a system that performs communication in an unlicensed band, a transmitting device (base station or UE) that wants to transmit a signal through the unlicensed band performs a channel access procedure (or listen-before talk (LBT)) for the unlicensed band to perform the communication before transmitting the signal, and when it is determined that the unlicensed band is in an idle state according to the channel access procedure, the transmitting device may access the unlicensed band to perform signal transmission. When it is determined that the unlicensed band is not in an idle state according to the performed channel access procedure, the transmitting device may not perform signal transmission.

More specifically, when an base station or a UE wants to transmit a downlink or uplink signal in an unlicensed band, a channel access procedure that can be performed by the base station or UE may be described by classifying into at least the following types.

Type 1: Uplink/downlink signal transmission after performing a channel access procedure for a variable time Type 2: Uplink/downlink signal transmission after performing a channel access procedure for a fixed time Type 3: Downlink or uplink signal transmission without performing a channel access procedure Hereinafter, in various embodiments of the disclosure, a case in which the base station transmits a downlink signal to the UE through an unlicensed band and a case in which the UE transmits an uplink signal to the base station through an unlicensed band will be described together, but the content proposed in various embodiments of the disclosure may be applied in the same manner or with partially modified to the case in which the UE transmits an uplink signal to the base station through an unlicensed band or the case in which the base station transmits a downlink signal to the UE through an unlicensed band. Therefore, a detailed description of transmission and reception of downlink signals will be omitted. Further, in various embodiments of the disclosure, it is assumed that one downlink data information (codeword or TB) or uplink data information is transmitted and received between the base station and the UE. However, the content proposed in the disclosure may be applied to even the case in which the base station transmits a downlink signal to a plurality of UEs or the case in which a plurality of codewords or TBs are transmitted and received between the base station and the UE.

A transmitting node (hereinafter, base station or UE) that wants to transmit signals in an unlicensed band may determine a channel access procedure method according to the type of signal to be transmitted. For example, when the base station wants to transmit a downlink signal including a downlink data channel in an unlicensed band, the base station may perform a type 1 channel access procedure. When the base station wants to transmit a downlink signal, for example, a synchronization signal or a downlink control channel that does not include a downlink data channel in an unlicensed band, the base station may perform a type 2 channel access procedure and transmit the downlink signal.

In this case, the channel access procedure method may be determined according to a transmission length of a signal to be transmitted in an unlicensed band or a length of a time or interval used by occupying the unlicensed band. In general, the type 1 method may have to perform the channel access procedure for a longer time than that when performing the channel access procedure with the type 2 method. Accordingly, when a signal is to be transmitted during a short time period or a time of a reference time (e.g., Xms or Y symbol) or less, a type 2 channel access procedure may be performed. However, when a signal is to be transmitted during a long time period or a time of a reference time (e.g., Xms or Y symbol) or more, a type 1 channel access procedure may be performed. In other words, different type channel access procedures may be performed according to a use time of the unlicensed band.

When a type 1 channel access procedure is performed according to at least one of the above criteria, a channel access priority class may be determined according to a quality of service class identifier (QCI) of the signal to be transmitted in the unlicensed band, and a channel access procedure may be performed using at least one of predefined setup values, as illustrated in Table 1 for the determined channel access priority class. For example, each of QCI 1, 2, and 4 denotes QCI values for services such as conversational voice, conversational video (live streaming), and non-conversational video (buffered streaming). When a signal for a service that does not match to the QCI of Table 1 is to be transmitted to the unlicensed band, the QCI closest to the QCI of Table 1 and the service may be selected, and a channel access priority class for the QCI may be selected.

Table 1 represents the mapping relationship between channel access priority classes and QCI.

TABLE 1

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

Defer duration according to the determined channel access priority (p), a set (CW_p) of contention window values or sizes, minimum and maximum values (CW_min,p, CW_max,p) of contention window, or the maximum channel occupancy possible period (T_mcot,p), and the like may be determined through Table 2. In other words, an base station that wants to transmit a downlink signal in the unlicensed band performs a channel access procedure for the unlicensed band for a minimum T_f+m_p*T_sl time. T_f represents a fixed sensing length value (e.g., 16 us), and T_sl represents a sensing slot length (e.g., 9 us). Further, m_p is determined according to the priority class. When a channel access procedure is to be performed with a channel access priority class 3 (p=3), for a size T_f+m_p*T_sl of the defer duration required to perform the channel access procedure, the size thereof is set using m_p=3. When it is determined that the unlicensed band is in an idle state in all of the m_p*T_sl times, N=N−1 may be obtained. In this case, N is selected as an arbitrary integer value among values between 0 and a value (CW_p) of contention window at a time point that performs the channel access procedure. In the case of channel access priority class 3, a minimum contention window value and a maximum contention window value are 15 and 63, respectively. When it is determined that the unlicensed band is in an idle state in the defer duration and an additional channel access procedure execution gap, the base station may transmit a signal through the unlicensed band for a T_mcot,p time (8 ms). Table 2 illustrates a channel access priority class in the downlink. For convenience of description, the disclosure will be described using a downlink channel access priority class, but in the case of uplink, the channel access priority class in Table 2 may be reused or a channel access priority class for uplink transmission may be defined and used.

TABLE 2

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window value (CW_p) is a minimum value (CW_min,p) of the contention window. The base station that selects the N value may perform a channel access procedure in a T_sl period, and when it is determined that the unlicensed band is in an idle state through the channel access procedure performed in the T_sl period, the base station may change a value to N=N−1, and when N=0, the base station may transmit the signal through the unlicensed band for a maximum T_mcot,p time. When the unlicensed band determined through the channel access procedure at the time T_sl is not in an idle state, the channel access procedure may be performed again without changing the N value.

The value of the contention window (CW_p) may be changed based on the reception result for the downlink data channel in a reference subframe or a reference slot in the downlink signal transmission interval (or MCOT) in which the base station transmits most recently through the unlicensed band at or immediately before a time point at which the base station initiates a channel access procedure or a time point at which the base station selects the N value to perform the channel access procedure. In other words, the base station may receive the reception results of the UE for downlink data transmitted in the reference subframe or the reference slot and increase or minimize a size of CW_p according to a ratio (Z) of NACK among the received reception results.

Figure 2:
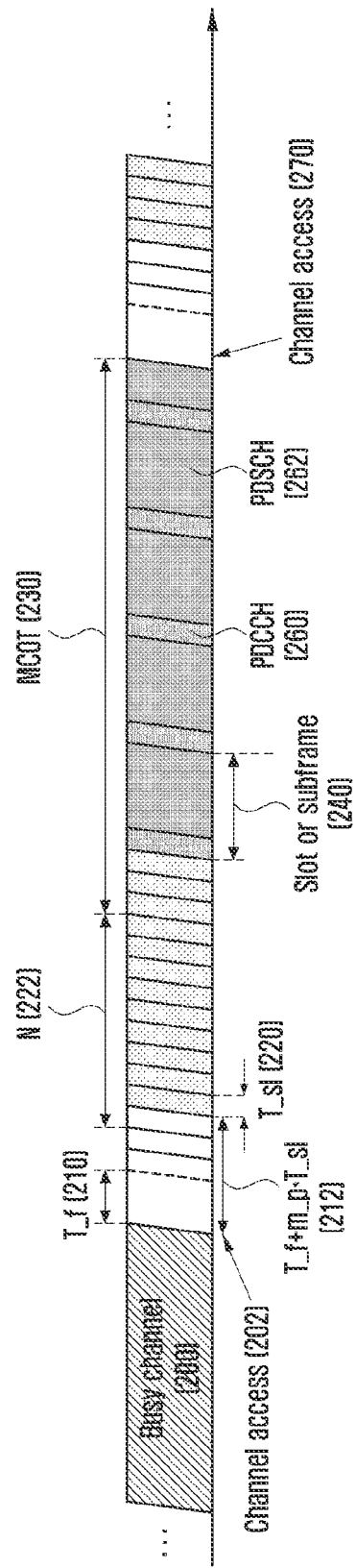
FIG. 2 is a diagram illustrating a channel access procedure in an unlicensed band according to an embodiment of the disclosure.

Referring to FIG. 2, for example, at or immediately before a time point 270 at which the base station initiates a channel access procedure or a time point at which the base station selects the N value to perform a channel access procedure, a first transmission interval 240 (hereinafter, the first slot to the first subframe) of a downlink signal transmission interval 230 transmitted most recently through the unlicensed band becomes a contention window change reference slot for the channel access procedure 270. When the base station cannot receive the reception result for a downlink data channel transmitted in the first slot 240 of the transmission interval 230, for example, when a time interval between the first subframe 240 and a time point 270 at which the base station initiates a channel access procedure is n slots or subframes or less, that is, when the base station initiates a channel access procedure before a time in which the UE may report the downlink data channel reception result for the first subframe 240, the first subframe 240 of the most recent downlink signal transmission interval transmitted before the downlink signal transmission interval 230 becomes a reference subframe. In other words, at a time point 270 in which the base station initiates the channel access procedure or at or immediately before a time point in which the base station selects the N value to perform the channel access procedure, when the base station does not receive the reception result of downlink data transmitted in the reference subframe from the UE, the base station may determine the first subframe of the most recently transmitted downlink signal transmission interval among the reception results for the downlink data channel previously received from the UEs as the reference subframe. The base station may determine the contention window size used in the channel access procedure 270 using the downlink data reception result received from the UEs for the downlink data transmitted through the downlink data channel in the reference subframe.

For example, when 80% or more of the reception results of the UE for downlink data transmitted to the UE through the downlink data channel in the first subframe 240 are determined to NACK among downlink signals transmitted through the unlicensed band, the base station that has transmitted a downlink signal through a channel access procedure (e.g., CW_p=15) set through a channel access priority class 3 (p=3) may increase the contention window from an initial value (CW_p=15) to a next contention window value (CW_p=31).

When 80% or more of the reception result of the UE is not determined to NACK, the base station may maintain a value of the contention window to the existing value or change a value of the contention window to an initial value of the contention window. In this case, the change of the contention window may be commonly applied to all channel access priority classes or may be applied only to the channel access priority class used in the channel access procedure. In this case, in a reference subframe or a reference slot for determining the contention window size change, a method of determining a reception result effective in determining the size of a contention window, that is, a method of determining a Z value among the reception results for the downlink data transmitted or reported by the UE to the base station for downlink data transmitted through a downlink data channel is as follows.

When the base station transmits one or more codewords or TB to one or more UEs in the reference subframe or the reference slot, the base station may determine the Z value by a ratio of NACK among reception results transmitted or reported by the UE for the TB received in the reference subframe or the reference slot. For example, when two codewords or two TBs are transmitted to one UE in the reference subframe or the reference slot, the base station receives transmission or report of a reception result of downlink data signals for the two TBs from the UE. When the NACK ratio (Z) among the two reception results is equal to or greater than a threshold value (e.g., Z=80%) defined in advance or set between the base station and the UE, the base station may change or increase the contention window size.

In this case, when the UE bundles the downlink data reception result for one or more subframes (e.g., the M number of subframes) including the reference subframe or slot and transmits or reports the downlink data reception result to the base station, the base station may determine that the UE has transmitted the M number of reception results. The base station may determine the Z value with a ratio of NACK among the M number of reception results and change, maintain, or initialize the contention window size.

When the reference subframe is a reception result for a second slot among two slots constituting one subframe, the base station may determine the Z value with a ratio of NACK among the reception results in which the UE transmits or reports to the base station for downlink data received in the reference subframe (i.e., second slot) and the next subframe.

Further, when scheduling information or downlink control information on a downlink data channel transmitted by the base station is transmitted in the same cell or frequency band as a cell or frequency band in which the downlink data channel is transmitted or when scheduling information or downlink control information on a downlink data channel transmitted by the base station is transmitted through an unlicensed band, but is transmitted in a different frequency or a cell different from the cell in which the downlink data channel is transmitted, when it is determined that the UE is not transmitted the reception result for the downlink data received in the reference subframe or the reference frame and when it is determined to DTX, NACK/DTX, or any state among the reception results for the downlink data transmitted by the UE, the base station may determine the reception result of the UE to NACK to determine the Z value.

Further, when scheduling information or downlink control information on a downlink data channel transmitted by the base station is transmitted through a licensed band, if it is determined to DTX, or NACK/DTX, or any state among the reception results for the downlink data transmitted by the UE, the base station may not include the reception result of the UE in the reference value Z of the contention window variation. In other words, the base station may ignore the reception result of the UE and determine the Z value.

Further, when the base station transmits scheduling information or downlink control information on a downlink data channel through a licensed band, if the base station does not actually transmit downlink data (no transmission) among the downlink data reception results for the reference subframe or the reference slot transmitted or reported by the UE to the base station, the base station may ignore the reception result transmitted or reported by the UE for the downlink data and determine the Z value.

In the 5G system, it is necessary to flexibly define and operate a frame structure in consideration of various services and requirements. As an example, it may be considered that each service has different subcarrier spacing according to requirements. In the current 5G communication system, a method of supporting a plurality of subcarrier spacing may be determined using Equation 1 as follows.

$$f=f_0 2^m \quad \text{[Equation 1]}$$

Here, $f_0$ denotes basic subcarrier spacing of the system, and m denotes an integer scaling factor. For example, when $f_0$ is 15 kHz, a set of subcarrier spacing that may have by a 5G communication system may be configured with 3.75 kHz, 7.5 kHz, 15 kHz, 30 kHz, 60 kHz, 120 kHz, 240 kHz, 480 kHz, and the like. A usable subcarrier spacing set may be different according to a frequency band. For example, 3.75 kHz, 7.5 kHz, 15 kHz, 30 kHz, and 60 kHz may be used in a frequency band of 6 GHz or less, and 60 kHz, 120 kHz, and 240 kHz may be used in a frequency band of 6 GHz or more.

A length of the OFDM symbol may vary according to the subcarrier spacing constituting the OFDM symbol. This is because the subcarrier spacing and the length of the OFDM symbol have an inverse relationship with each other as a characteristic of the OFDM symbol. For example, when the subcarrier spacing is doubled, the symbol length is reduced to ½, and conversely, when the subcarrier spacing is reduced to ½, the symbol length is doubled.

Hereinafter, a resource region through which a data channel is transmitted in a 5G communication system will be described.

Figure 3:
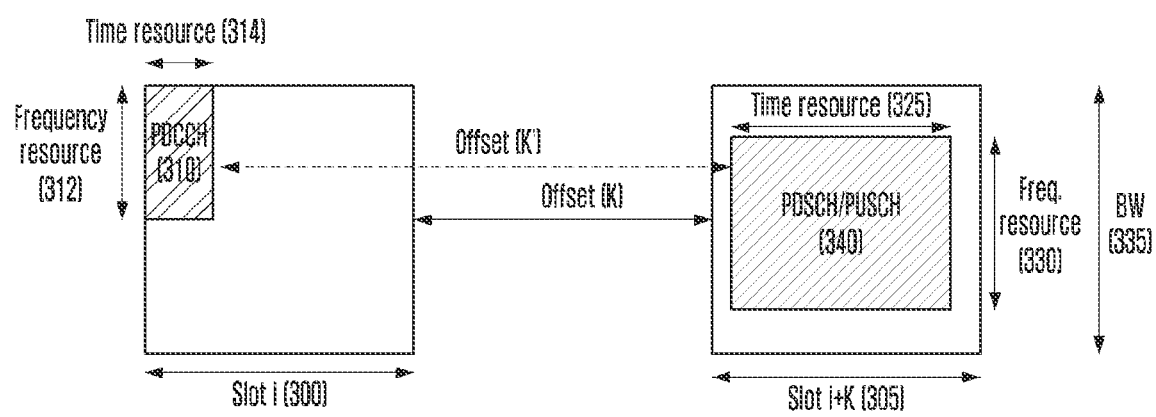
FIG. 3 is a diagram illustrating a downlink to uplink scheduling method and a resource region in an NR system according to an embodiment of the disclosure.

FIG. 3 is a diagram illustrating a resource region through which a data channel is transmitted in a 5G communication system according to an embodiment of the disclosure.

The UE monitors or searches for a PDCCH 310 in a downlink control channel region (hereinafter, control resource set (CORESET) to search space (SS)) set through a higher signal from the base station. In this case, the downlink control channel region is configured with time domain resource 314 and frequency domain resource 312 information, the time domain resource 314 information may be configured in units of a symbol, and the frequency domain resource 312 information may be configured in units of an RB or an RB group. When the UE detects the PDCCH 310 in a slot i, 300, the UE obtains downlink control information (DCI) transmitted through the detected PDCCH 310. Through the received downlink control information (DCI), the UE may obtain scheduling information on a downlink data channel or an uplink data channel. In other words, the DCI may include at least information on a resource region (or PDSCH transmission region) in which the UE should receive a downlink data channel (hereinafter, PDSCH) transmitted from the base station or resource region information in which the UE is allocated from the base station for transmission of an uplink data channel (PUSCH).

A case in which the UE is scheduled to transmit an uplink data channel (PUSCH) will be described as an example as follows. The UE that has received the DCI may obtain a slot index or offset information (K) to receive a PUSCH through DCI, and determine a PUSCH transmission slot index. For example, the UE may determine that it has been scheduled to transmit the PUSCH in a slot i+K, 305 through the received offset information K based on the slot index i, 300 that receives the PDCCH 310. In this case, the UE may determine a PUSCH start symbol or time in the slot i+K, 305 or the slot i+K through the received offset information K based on a CORESET received the PDCCH 310. Further, the UE may obtain information on a PUSCH transmission time-frequency domain resource 340 in the PUSCH transmission slot 305 in the DCI. In this case, PUSCH transmission frequency domain resource information 330 may be information of a PRB to a PRB group unit. The PUSCH transmission frequency domain resource information 330 is a domain included in an initial uplink bandwidth (initial uplink BW) 335 or an initial uplink bandwidth part (initial uplink BWP) determined or configured by the UE through an initial access procedure. When the UE receives an uplink bandwidth or an uplink bandwidth part through a higher signal, the PUSCH transmission frequency domain resource information 330 is a region included in an uplink bandwidth or an uplink bandwidth part configured through the higher signal.

PUSCH transmission time resource region information 325 may be information of a symbol or a symbol group unit or information representing absolute time information. In this case, the PUSCH transmission time resource region information 325 may be represented with a combination of a PUSCH transmission start time or symbol and a length of a PUSCH or a PUSCH end time or symbol to be included in the DCI as one field or value. In this case, the PUSCH transmission time resource region information 325 may be included in the DCI as a field or value representing each of the PUSCH transmission start time or symbol and the length of the PUSCH or the PUSCH end time or symbol. The UE may transmit a PUSCH in the PUSCH transmission resource region 340 determined through the DCI.

In a wireless communication system, in order to form a radio link with the base station, the UE goes through an initial access step as follows. First, in order to access a cell in the network, the UE performs a cell search for obtaining synchronization with the cell in the network and obtains a master information block (MIB) through PBCH decoding. The MIB includes the most basic information for accessing the system. Based on the information, the UE decodes the PDCCH and the PDSCH to obtain an SIB. Thereafter, through a random access step, the UE exchanges an identity with the base station and performs initial access to the network through steps such as registration and authentication.

Hereinafter, a cell initial access operation procedure of a 5G wireless communication system will be described in more detail with reference to the drawings.

Figure 4:
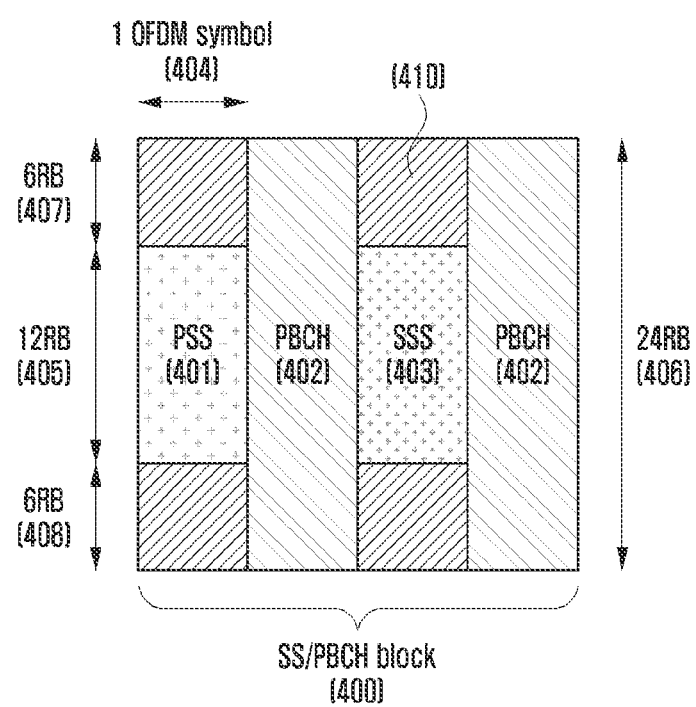
FIG. 4 is a diagram illustrating a synchronization signal block in an NR system according to an embodiment of the disclosure.

FIG. 4 is a diagram illustrating a synchronization signal (SS)/PBCH block 400 considering in a 5G communication system according to an embodiment of the disclosure.

The SS/PBCH block 400 is configured with a primary synchronization signal (PSS) 401, a secondary synchronization signal (SSS) 403, and a PBCH 402.

The PSS 401 and the SSS 403 may be transmitted to 12 RBs 405 at the frequency axis and 1 OFDM symbol 404 at the time axis. In 5G, total 1008 different cell IDs may be defined, the PSS 401 may have three different values according to a physical layer ID of the cell, and the SSS 403 may have 336 different values. The UE may know one of 1008 cell IDs as the combination thereof through detection of the PSS 401 and the SSS 403. This may be represented by Equation 2.

$$N_{ID}^{cell}=3N_{ID}^{(1)}+N_{ID}^{(2)} \quad \text{[Equation 2]}$$

$N^{(2)}_{ID}$ may be estimated from the SSS 403 and has a value between 0 and 335. $N^{(1)}_{ID}$ may be estimated from the PSS 401 and has a value between 0 and 2. An $N^{cell}_{ID}$ value, which is a cell ID, may be estimated by a combination of $N^{(1)}_{ID}$ and $N^{(2)}_{ID}$.

The PBCH 402 may be transmitted to 24 RBs 406 at the frequency axis and 2 OFDM symbols 404 at the time axis. In the PBCH 402, various system information called MIBs may be transmitted, and included contents are as follows.

---
systemFrameNumber
subCarrierSpacingCommon
ssb-SubcarrierOffset
dmrs-TypeA-Position
pdcch-ConfigSIB1
cellBarred
intraFreqReselection
spare

---

As described above, the SS block 400 is configured with the PSS 401, the SSS 403, and the PBCH 402, and is mapped to total 4 OFDM symbols at the time axis. Because sizes of a transmission bandwidth 405 of the PSS 401 and the SSS 403 configured with 12 RBs and a transmission bandwidth 406 of the PBCH 402 configured with 24 RBs are different, within the transmission bandwidth 406 of the PBCH 402, in the OFDM symbol in which the PSS 401 and the SSS 403 are transmitted, while the PSS 401 and the SSS 403 are transmitted, 6 RBs exist at both sides (corresponding to 407 and 408 in FIG. 4) except 12 RBs, and resource regions corresponding to reference numerals 407 and 408 may be used for transmitting other signals or may be empty.

All of the synchronization signal blocks may be transmitted with the same analog beam. That is, all of the PSS 401, the SSS 403, and the PBCH 402 may be transmitted with the same beam. Because an analog beam has characteristics that cannot be applied to the frequency axis, the same analog beam is applied to all frequency axis RBs within a specific OFDM symbol to which a specific analog beam is applied. That is, all four OFDM symbols through which the PSS 401, the SSS 403, and the PBCH 402 are transmitted may be transmitted with the same analog beam.

After decoding the PDCCH and the PDSCH based on system information included in the received MIB, the UE may obtain an SIB, and the SIB includes at least an uplink cell bandwidth, a random access parameter, a paging parameter, and parameters related to an uplink power control, and the like. The UE may form a radio link with the network through a random access process based on system information and synchronization with the network obtained in a search process of the cell. Random access may use a contention-based or contention-free method. When cell selection and reselection are performed in an initial access step of the cell, for purposes such as when moving from an RRC_IDLE state to RRC_CONNECTED, a contention-based access method may be used. Contention-free random access may be used in case that downlink data arrives, in case of handover, in case of location measurement, or in case of resetting uplink synchronization.

Figure 5:
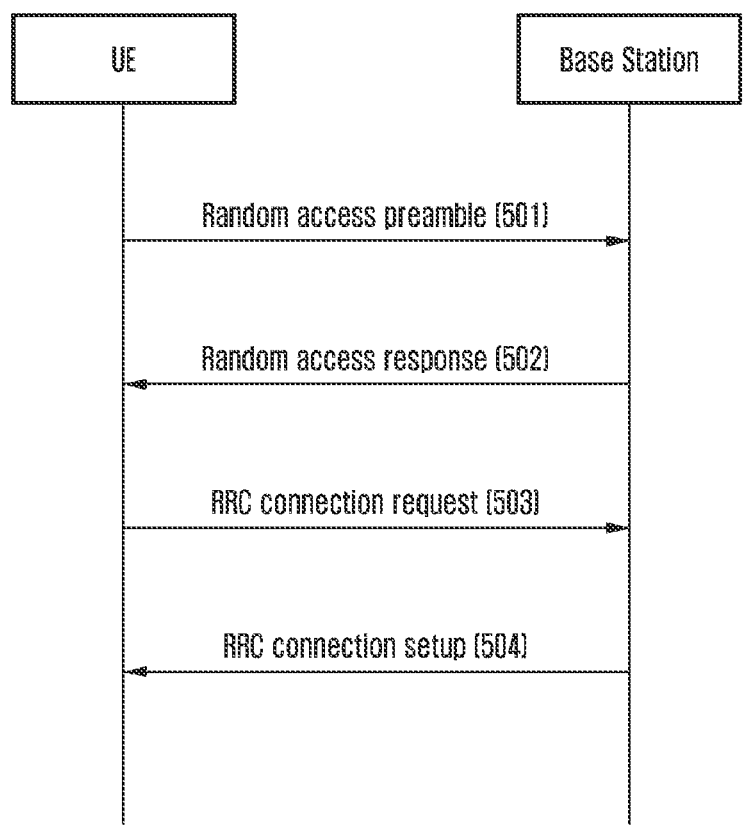
FIG. 5 is a diagram illustrating an example of a contention-based access procedure according to an embodiment of the disclosure.

FIG. 5 is a diagram illustrating a contention-based access process in an NR system according to an embodiment of the disclosure. Referring to FIG. 5, a random access process is configured with a procedure of four steps. First, in step 501, the UE transmits a random access preamble so that the base station may estimate the transmission timing of the UE. The random access preamble is transmitted through an uplink physical layer channel corresponding to a PRACH, and a detailed description thereof will be described later. Through step 501 of transmitting the random access preamble, the base station may recognize that there is a random access attempt and estimate a delay time between the UE and the base station to adjust the uplink transmission timing.

In second step 502, the base station transmits a random access response (RAR) to the detected random access attempt to the UE. The RAR is transmitted through a PDSCH and includes the following message.

- Random access preamble sequence index detected by the network
- Temporary cell radio network temporary identifier (TC-RNTI)
- Uplink scheduling grant
- Timing advance value The UE that has transmitted the preamble monitors a PDCCH for the RAR within a preset time. Frequency domain resource control information on the PDSCH through which the RAR is transmitted may be obtained from DCI transmitted to a common search space of a PDCCH set to a random access radio network temporary identifier (RA-RNTI). The UE that has received the RAR adjusts uplink transmission timing and proceeds to the next step.

In third step 503, the UE transmits an L2/L3 message for an RRC connection request to the base station. The UE may transmit a message such as an ID or HARQ of the UE using uplink physical layer resources allocated in the random access response in the second step 502. In this case, a message is transmitted through a PUSCH, which is an uplink physical channel set to TC-RNTI.

In fourth step 504, the UE receives a downlink message for contention resolution and RRC connection setup from the base station. The contention resolution message is transmitted through the PDSCH, and scheduling information on the corresponding PDSCH may be obtained from DCI transmitted to the PDCCH set to C-RNTI.

In a contention-free random access process, because contention resolution is not required, only the first step 501 and the second step 502 are used in FIG. 5.

Figure 6:
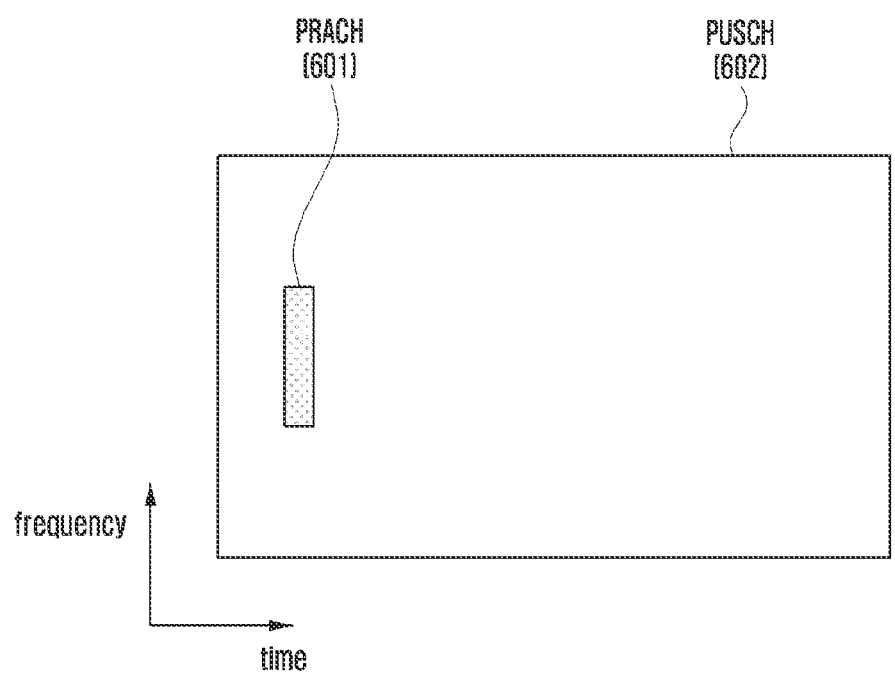
FIG. 6 is a diagram illustrating an uplink physical layer channel for random access according to an embodiment of the disclosure.

FIG. 6 is a diagram illustrating an uplink physical layer channel used in a random access process in NR according to an embodiment of the disclosure.

As described above, in a first step of the random access process, the UE may transmit a random access preamble from a PUSCH 602 using a PRACH 601. Each cell has 64 available preamble sequences, and 4 long preamble formats and 9 short preamble formats may be used according to a transmission type. The UE generates 64 preamble sequences using a root sequence index and a cyclic shift value signaled by system information, and randomly selects one sequence and uses the one sequence as a preamble.

A network may notify the UE of which time-frequency resource may be used for a PRACH using SIB or higher layer signaling. A frequency resource indicates a start RB point of transmission to the UE, and the number of use RBs is determined according to a preamble format and applied subcarrier spacing.

The time resource may notify preset PRACH duration, a subframe index including a PRACH occasion and a start symbol, and the number of PRACH occasions in a slot through a PRACH configuration index (0 to 255), as illustrated in Table 3.

TABLE 3

| PRACH configuration Index | Preamble format | $n_{SFX} \bmod x = y$ | | Sub frame number | Starting symbol | Number of PRACH slots within a subframe | number of time-domain PRACH occasions within a PRACH slot | PRACH duration |
| --- | --- | --- | --- | --- | --- | --- | --- | --- |
| | | x | y | | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |
| 7 | 0 | 8 | 1 | 9 | 0 | — | — | 0 |
| 8 | 0 | 4 | 1 | 1 | 0 | — | — | 0 |
| 9 | 0 | 1 | 1 | 4 | 0 | — | — | 0 |
| 10 | 0 | 4 | 1 | 7 | 0 | — | — | 0 |
| ... | | | | | ... | | | |
| 251 | C | 1 | 0 | 2, 7 | 0 | 2 | 2 | 6 |
| 252 | C2 | 1 | 0 | 1, 4, 7 | 0 | 2 | 2 | 6 |

TABLE 3-continued

| PRACH configuration Index | Preamble format | $n_{SFN} \mod x = y$ | | Sub frame number | Starting symbol | Number of PRACH slots within a subframe | number of time-domain PRACH occasions within a PRACH slot | PRACH duration |
|---|---|---|---|---|---|---|---|---|
| | | x | y | | | | | |
| 253 | C2 | 1 | 0 | 0, 2, 4, 6, 8 | 0 | 2 | 2 | 6 |
| 254 | C2 | 1 | 0 | 0, 1, 2, 3, 4, 5, 6, 7, 8, 9 | 0 | 2 | 2 | 6 |
| 255 | C2 | 1 | 0 | 1, 3, 5, 7, 9 | 0 | 2 | 2 | 6 |

When attempting a random access procedure in an unlicensed band, in order to transmit a PRACH preamble at a PRACH occasion, the UE should perform a channel access procedure. When it is determined that the unlicensed band is in an idle state according to the execution result of the channel access procedure, the UE may access the unlicensed band to transmit the preamble. However, when the unlicensed band is not in an idle state, the UE cannot transmit the preamble; thus, the probability of success of the random access procedure decreases. Accordingly, in a 5G communication system, in order to overcome deterioration of the success probability of random access due to the failure of the channel access procedure, transmission of multiple PRACH preambles at a PRACH occasion may be considered. When one UE transmits multiple PRACH preambles in the unlicensed band, a performance of the preamble may be improved to increase the probability of success of random access, but by blocking channel access of other UEs, the probability of success of random access of other UEs may be reduced. Therefore, when transmitting multiple PRACH preambles, it is necessary to change a multiple PRACH preamble transmission method in consideration of a preamble performance of a UE transmitting the multiple PRACH preambles and the probability of success of the channel access procedure of other UEs.

Accordingly, in various embodiments of the disclosure, in an base station and UE configured to receive or transmit a PDSCH or a PUSCH in an unlicensed band, when the UE intends to perform random access, a method of transmitting multiple PRACH preambles is proposed. More specifically, a method and device for improving a preamble performance of the UE or the probability of success of a channel access procedure of other UEs as the UE changes the channel access procedure method according to the number of multiple PRACH preamble transmissions are proposed.

Hereinafter, the method and device proposed in the embodiments of the disclosure are not limitedly applied to each embodiment, and will be possible to utilize in a method and device for configuring or determining multiple PRACH preamble transmission using all or a combination of one or more embodiments proposed by the disclosure. Further, in an embodiment of the disclosure, a case in which the UE transmits a PRACH preamble during a random access process will be described as an example, but it will be applicable to a case in which the UE transmits multiple PUSCHs or PUCCHs, a case in which the base station transmits multiple PDSCHs or PDCCHs, or a case of transmitting multiple physical sidelink shared channels (PSSCH) or physical sidelink control channels (PSCCH) between UEs. Further, in the embodiment of the disclosure, the description will be made on the assumption of an base station and UE operating in an unlicensed band, but a method and device proposed in the embodiment of the disclosure may be applied even to an base station and UE operating in a licensed band or a shared spectrum as well as an unlicensed band.

Embodiment 1

In the present embodiment, in an base station and UE operating in an unlicensed band, when the UE transmits multiple PRACH preambles, a method of configuring a channel access procedure gap is proposed. In particular, a method of increasing a length of a PRACH preamble transmission interval according to the number of PRACH preamble transmissions is proposed.

Figure 7:
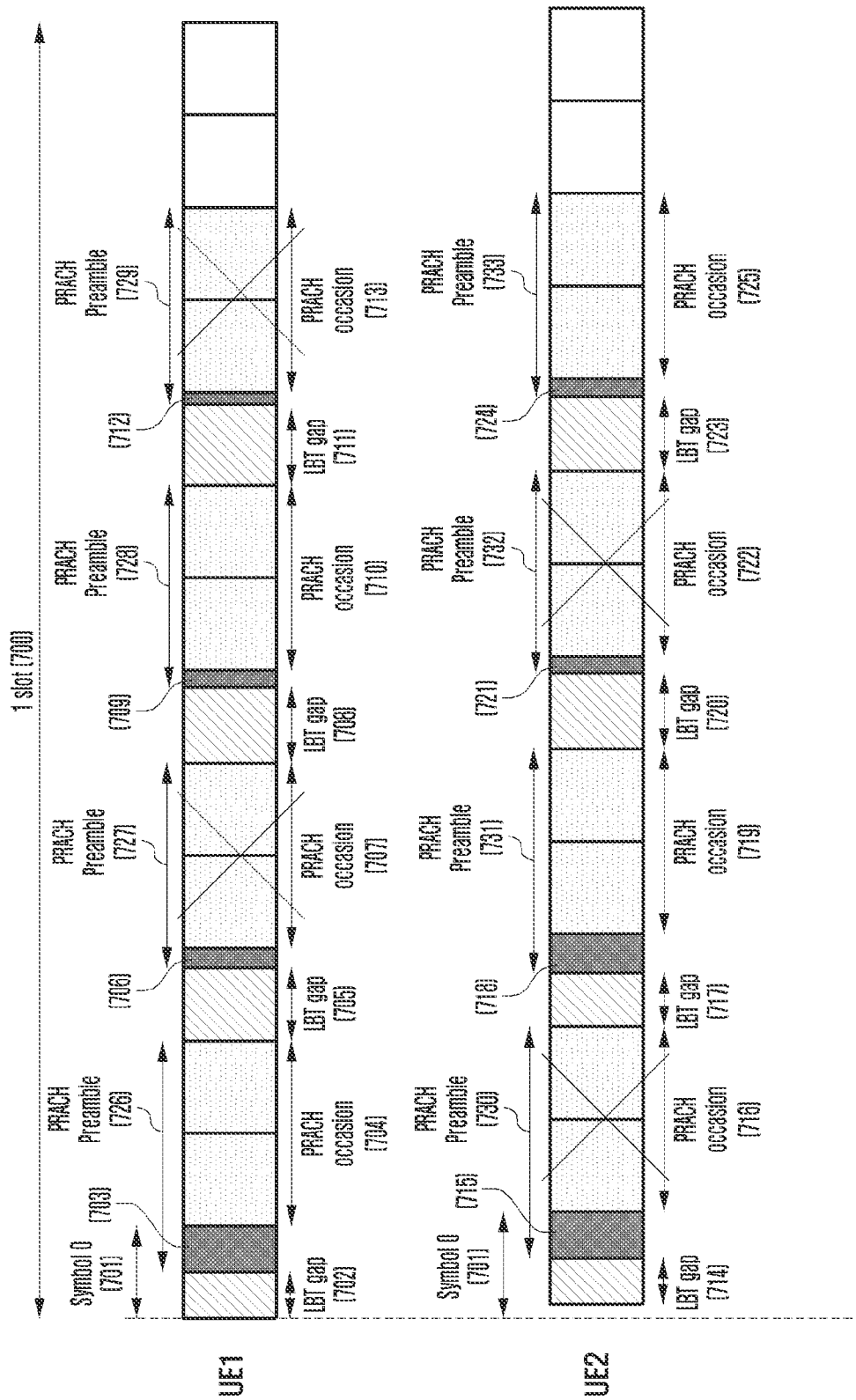
FIG. 7 is a diagram illustrating an example of various embodiments of the disclosure.

An operation of the embodiment will be described with reference to FIG. 7 as follows.

In an base station and UE transmitting and receiving signals in an unlicensed band, it is assumed that the UE is configured to transmit multiple PRACH preambles. In order to transmit a PRACH preamble at PRACH occasions 704, 707, 710, and 713 indicated by higher layer signaling or downlink control information, a UE 1 performs a channel access procedure at channel access procedure gaps 702, 705, 708, and 711 until a time point immediately before transmission of the PRACH preamble. As an execution result of the channel access procedure, the UE 1 may transmit a PRACH preamble at all PRACH occasions determined to an idle band.

When a first PRACH preamble 726 of the UE 1 is transmitted before a transmission possible time of a first PRACH preamble 730 of a UE 2 due to transmission delay of the UE 2, after performing a channel access procedure 702 for transmission of the first PRACH preamble 726, the UE 1 may determine that it is in an idle band to transmit the first PRACH preamble 726. However, the UE 2 determines that it is not in an idle band as an execution result of a channel access procedure 714 due to transmission of the first PRACH preamble 726 of the UE 1 and cannot transmit the first PRACH preamble 730. In FIG. 7, when all gaps of the channel access procedure performed by the UE 1 and the UE 2 are the same, the UE 2 cannot transmit a PRACH preamble due to transmission of multiple PRACH preambles by the UE 1.

In order to protect the UE 2 from performing the channel access procedure, the UE 1 may reduce a cyclic prefix (CP) length of the PRACH preamble according to the number of multiple PRACH transmissions. For example, when the UE 1 transmits the first PRACH preamble 726 and then reduces a CP length 706 of a second PRACH preamble 727, a channel access procedure gap 705 to be performed for transmission of the second PRACH preamble 727 becomes longer. However, in the case of the UE 2, because a channel access procedure gap 717 performed for transmission of a second PRACH preamble 719 is the same as the previous channel access procedure gap 714, the probability of accessing the channel increases. Similarly, when the above-described method is equally applied to the second PRACH preamble transmission of the UE 2, third PRACH preamble transmission 732 of the UE 2 fails, and third PRACH preamble transmission 728 of the UE 1 may succeed. Accordingly, both the UE 1 and the UE 2 may perform multiple PRACH preamble transmission. A more specific method of adjusting a CP length of the PRACH preamble is as follows.

Method 1-1: Method of Reducing a CP Length Based on a Setup Value

The method 1-1 is a method in which the UE reduces a CP length according to the number of multiple PRACH preamble transmissions based on a preset value or rule with higher layer signaling or control information. For example, when the base station instructs the UE to transmit multiple PRACH preambles, the UE may reduce the CP length by a multiple of 1/X according to the number of PRACH preamble transmissions, and the multiple value may be included in higher layer signaling or control information to be configured to the UE by the base station. As another method, the base station may configure an offset value of the CP length to the UE. In other words, when the base station configures the offset value to X, the UE may reduce the CP length by X according to the number of PRACH preamble transmissions to transmit the PRACH preamble. The X value in the above two schemes may be configured by the base station to the UE to one value using higher layer signaling or control information, may configure a value according to the number of PRACH preamble transmissions to a set (e.g., {X, Y, Z, T}), or may be configured to a predetermined rule (e.g., X, 2X, 3X, 4X) according to PRACH preamble transmission.

Method 1-2: Method of Reducing a Random Value-Based CP Length

The method 1-2 is a method in which the UE randomly selects a multiple or offset X value in the method 1-1 from a candidate group set by the base station. For example, when the base station instructs a set (e.g., {a, b, c, d}) of a multiple or offset value to the UE with higher layer signaling or control information, the UE may randomly extract a value within a preset set when transmitting a PRACH to reduce the CP length. In this case, the UE may extract a value when transmitting each PRACH preamble or apply the same value when transmitting each PRACH preamble after extracting once.

Embodiment 2

In the present embodiment, in an base station and UE operating in an unlicensed band, when the UE transmits multiple PRACH preambles, a method of configuring a channel access procedure gap is proposed. In particular, a method of increasing a channel access procedure gap according to the number of PRACH preamble transmissions is proposed.

Figure 8:
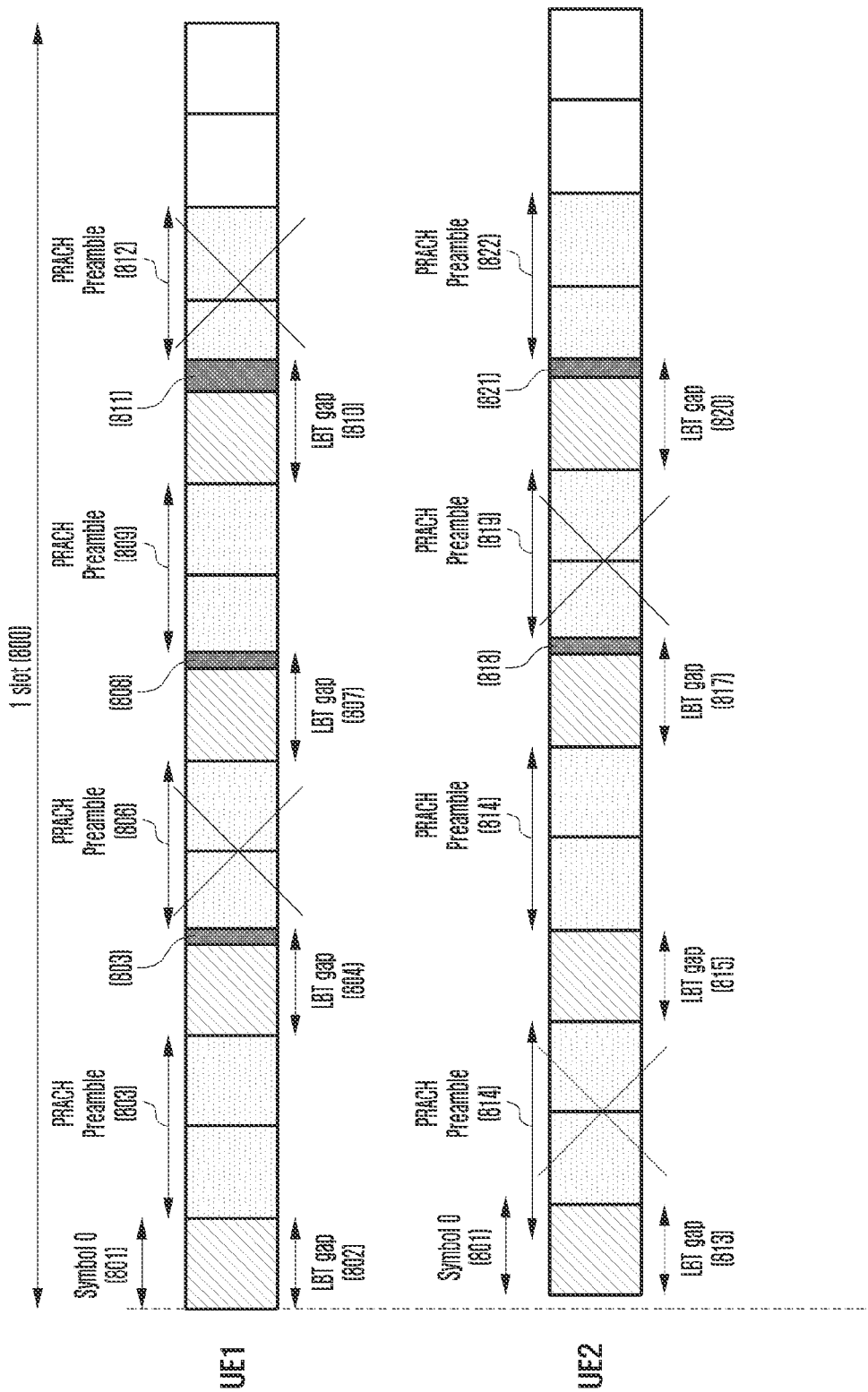
FIG. 8 is a diagram illustrating another example of various embodiments of the disclosure.

An operation of the embodiment will be described with reference to FIG. 8 as an example.

In an base station and UE transmitting and receiving signals in an unlicensed band, it is assumed that the UE is configured to perform multiple PRACH preamble transmission. In order to transmit a PRACH preamble at a PRACH occasion indicated by higher layer signaling or downlink control information, a UE 1 performs channel access procedures 802, 804, 807, and 810 until a time point immediately before transmission of the PRACH preamble. As an execution result of a channel access procedure, the UE 1 may transmit a PRACH preamble for all PRACH occasions determined to an idle band.

In order to protect the UE 2 from performing the channel access procedure, the UE 1 may increase a channel access procedure gap according to the number of multiple PRACH transmissions. For example, after transmitting a first PRACH preamble 803, the UE 1 may increase a channel access procedure gap 804 for transmitting a second PRACH preamble 806. However, in the case of the UE 2, because a channel access procedure gap 815 performing for transmission of a second PRACH preamble 816 is the same as a previous channel access procedure gap 813, the probability of accessing the channel increases. Similarly, when the above-described method is applied to second PRACH transmission of the UE 2, third PRACH preamble transmission 819 of the UE 2 fails, and third PRACH preamble transmission 809 of the UE 1 may succeed. Accordingly, both the UE 1 and the UE 2 may perform multiple PRACH transmission. In this case, the UE may adjust the PRACH preamble length by the adjusted channel access procedure gap. The UE may adjust the CP length of the PRACH preamble using a puncturing or rate matching method by the adjusted length, and perform a channel access procedure until a time point immediately before transmission of the PRACH preamble. A more specific method of adjusting the channel access procedure gap is as follows.

Method 2-1: Method of Increasing a Contention Window Value or Size

The method 2-1 is a method in which the UE increases a contention window value or size according to the number of PRACH preamble transmissions. For example, assuming that the UE performs a channel access procedure with a priority class 3 (p=3) of the above-described type1 for PRACH preamble transmission and that a value (CW_p) of the contention window used for transmitting the first PRACH preamble is 15, the UE configures the contention window value of the channel access procedure performed for transmitting the second PRACH preamble to 31, which is the next value. For this reason, the channel access procedure gap for transmitting the second PRACH preamble by the UE probabilistically increases.

Method 2-2: Method of Adjusting a Selection Gap of the Counter N Value

As described above, N is selected as an arbitrary integer value among values between 0 and a value (CW_p) of a contention window at a time point that performs the channel access procedure. In the method 2-2, when a channel access procedure is performed according to the number of PRACH preamble transmissions of the UE, a gap of selecting an N value may be adjusted. For example, assuming that the N value between 0 and CW_p used when performing the channel access procedure for transmitting the first PRACH preamble by the UE is X, the UE may select the N value as an integer value between X and CW_p when performing the channel access procedure for transmitting the second PRACH preamble. Therefore, the channel access procedure gap for transmitting the second PRACH preamble by the UE increases.

Method 2-3: Method of Increasing the Length or Number of Sensing Slots Based on a Setup Value The method 2-3 is a method in which the UE increases the number (or length) of sensing slots according to the number of multiple PRACH preamble transmissions based on a preset value or rule with higher layer signaling or control information. For example, when the base station instructs the UE to transmit multiple PRACH preambles, the UE may increase the number (or length) of sensing slots by a multiple of X according to the number of PRACH preamble transmissions, and the multiple value may be included in the higher layer signaling or control information and be configured by the base station to the UE. As another method, the base station may configure an offset value of the number (or length) of sensing slots to the UE. In other words, when the base station configures the offset value to X, the UE may increase the number (or length) of sensing slots by X according to the number of PRACH preamble transmissions to perform a channel access procedure. The X value in the above two methods may be configure by the base station to the UE to one value using higher layer signaling or control information, may configure a value according to the number of PRACH preamble transmissions to a set (e.g., {X, Y, Z, T}), or may be configured to a predetermined rule (e.g., X, 2X, 3X, 4X) according to PRACH preamble transmission. Further, Method 3 may be applied to the type1 or type2 channel access procedure.

Method 2-4: Method of Increasing a Random Value-Based Sensing Slot Length

The method 2-4 is a method in which the UE randomly selects a multiple or offset X value in the method 2-3 from a candidate group set to the base station. For example, when the base station instructs a set (e.g., {a, b, c, d}) of a multiple or offset value to the UE with higher layer signaling or control information, the UE may randomly increase a value within the preset set by the number (or length) of sensing slots when transmitting the PRACH. In this case, the UE may extract a value when transmitting each PRACH preamble or apply the same value when transmitting each PRACH preamble after extracting once.

Embodiment 3

In the present embodiment, in an base station and UE operating in an unlicensed band, when the UE transmits multiple PRACH preambles, a method of configuring a channel access procedure gap is proposed. In particular, a method of reducing a length of a PRACH preamble transmission interval according to the number of PRACH preamble transmissions is proposed.

Figure 9:
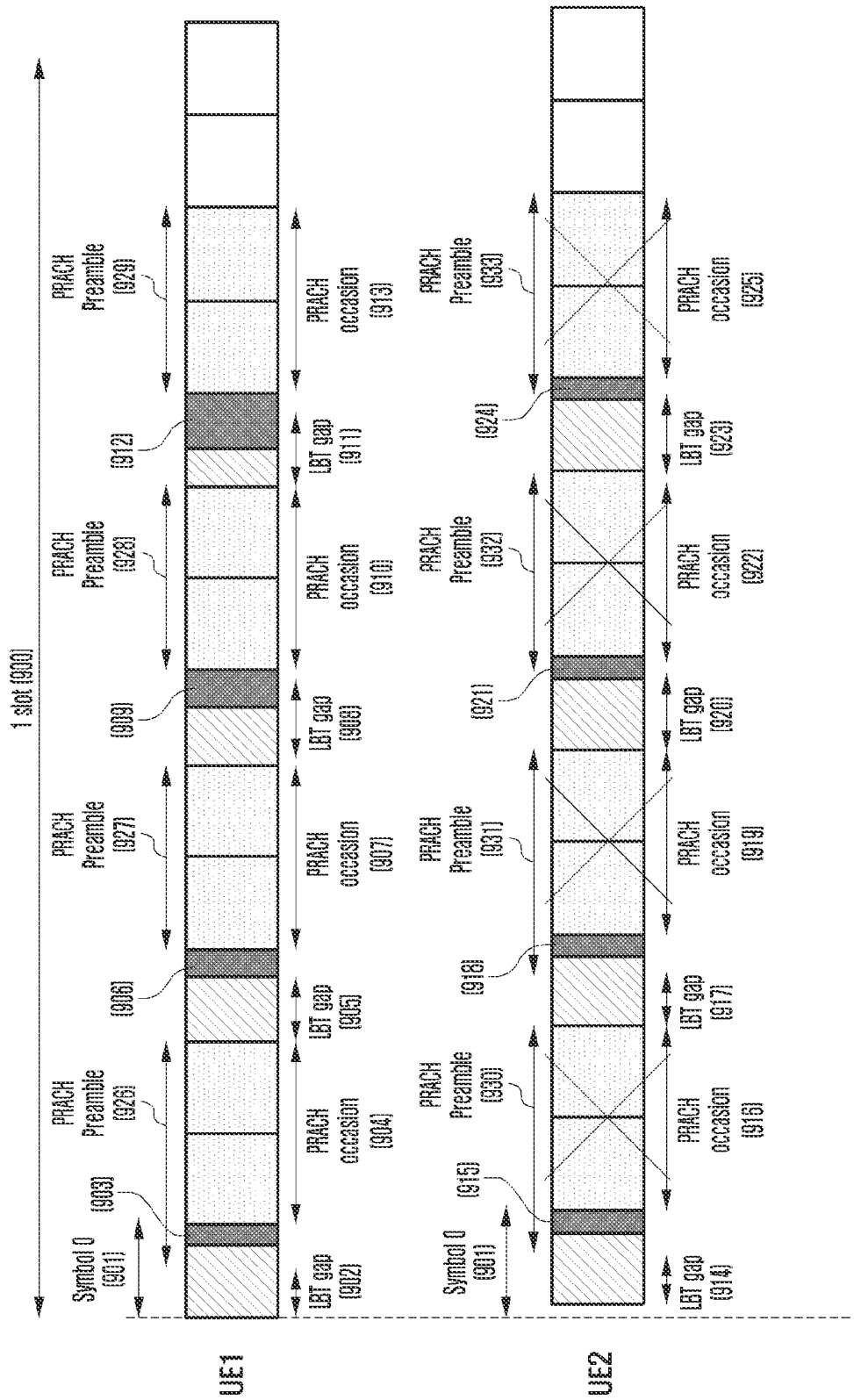
FIG. 9 is a diagram illustrating another example of various embodiments of the disclosure.

An operation of the embodiment will be described with reference to FIG. 9 as follows.

In an base station and UE transmitting and receiving signals in an unlicensed band, it is assumed that the UE is configured to perform multiple PRACH preamble transmission. In order to transmit a PRACH preamble at PRACH occasions 904, 907, 910, and 913 indicated by higher layer signaling or downlink control information, a UE 1 performs channel access procedures 902, 905, 908, and 911 until a time point immediately before PRACH preamble transmission. As an execution result of a channel access procedure, a UE 1 may transmit a PRACH preamble for all PRACH occasions determined to an idle band.

In embodiments 1 and 2, because both the UE 1 and a UE 2 enable multiple PRACH preamble transmission, it may be efficient in terms of coexistence, but the random access success probability of the UE 1 may be reduced; thus, technique that improves the random access success probability of the UE 1 is needed.

In order to increase the probability of success in performing the channel procedure of the UE 1, the UE 1 may increase a cyclic prefix (CP) length of the PRACH preamble according to the number of multiple PRACH transmissions. For example, when the UE 1 transmits a first PRACH preamble 926 and then increases a CP length 906 of a second PRACH preamble 927, a channel access procedure gap 905 to be performed for transmission of the second PRACH preamble 927 is reduced. However, in the case of the UE 2, because a channel access procedure gap 917 performed for transmission of a second PRACH preamble 919 is the same as a previous channel access procedure gap 914, the probability of accessing the channel is further reduced. Similarly, when the above-described method is applied to third PRACH preamble transmission of the UE 1, the probability of third PRACH preamble transmission 928 of the UE 1 may further increase. Accordingly, the UE 1 may perform multiple PRACH preamble transmission at all possible PRACH occasions 904, 907, 910, and 913. A more specific method of adjusting a CP length of the PRACH preamble is as follows.

Method 3-1: Method of Increasing a CP Length Based on a Setup Value

The method 3-1 is a method in which the UE increases a CP length according to the number of multiple PRACH preamble transmissions based on a preset value or rule with higher layer signaling or control information. For example, when the base station instructs the UE to transmit multiple PRACH preambles, the UE may increase the CP length by a multiple of 1/X according to the number of PRACH preamble transmissions, and the multiple value may be included in higher layer signaling or control information to be configured to the UE by the base station. As another method, the base station may configure an offset value of the CP length to the UE. In other words, when the base station configures the offset value to X, the UE may increase the CP length by X according to the number of PRACH preamble transmission to transmit the PRACH preamble. The X value in the above two techniques may be configured by the base station to the UE to one value using higher layer signaling or control information, may configure a value according to the number of PRACH preamble transmissions to a set (e.g., {X, Y, Z, T}), or may be configured to a predetermined rule (e.g., X, 2X, 3X, 4X) according to PRACH preamble transmission.

Method 3-2: Method of Increasing a Random Value-Based CP Length

The method 3-2 is a method in which the UE randomly selects a multiple or offset X value in method 3-1 from a candidate group set by the base station. For example, when the base station instructs a set (e.g., {a, b, c, d}) of a multiple or offset value to the UE with higher layer signaling or control information, the UE may randomly extract a value within a preset set when transmitting the PRACH to increase the CP length. In this case, the UE may extract a value when transmitting each PRACH preamble or apply the same value when transmitting each PRACH preamble after extracting once.

Embodiment 4

In the present embodiment, in an base station and UE operating in an unlicensed band, when the UE transmits multiple PRACH preambles, a method of configuring a channel access procedure gap is proposed. In particular, a method of reducing a channel access procedure gap in order to improve a random access success probability of the UE according to the number of PRACH preamble transmissions is proposed.

An operation of the embodiment will be described with reference to FIG. 9 as follows.

In order to increase the probability of success of the UE 1 performing a channel procedure, the UE 1 may reduce the channel access procedure gap according to the number of multiple PRACH transmissions. For example, after transmitting a first PRACH preamble 926, the UE 1 may reduce a channel access procedure gap 905 for transmitting a second PRACH preamble 927. However, in the case of the UE 2, because a channel access procedure gap 917 performing for transmission of a second PRACH preamble 919 is the same as a previous channel access procedure gap 914, the probability of accessing the channel decreases. Similarly, when the above-described method is applied to third PRACH preamble transmission of the UE 1, the probability of third PRACH preamble transmission 928 of the UE 1 may further increase.

Accordingly, the UE 1 may perform multiple PRACH preamble transmission in all possible PRACH occasions 904, 907, 910, and 913. In this case, the UE may adjust the PRACH preamble length by the adjusted channel access procedure gap. The UE may adjust the CP length of the PRACH preamble using a puncturing or rate matching method by the adjusted length, and perform a channel access procedure until a time point immediately before transmission of the PRACH preamble. A more specific method of adjusting the channel access procedure gap is as follows.

Method 4-1: Method of Reducing a Contention Window Value or Size

The method 4-1 is a method in which the UE decreases a contention window value or size according to the number of PRACH preamble transmissions. For example, assuming that a channel access procedure is performed with a priority class 3 (p=3) of the above-described type1 for transmission of a UE PRACH preamble and that a contention window value (CW_p) used for transmitting the first PRACH preamble is 31, the contention window value of the channel access procedure performed by the UE for transmitting a second PRACH preamble may be configured to 15, which is a previous value. For this reason, the channel access procedure gap for transmitting the second PRACH preamble by the UE probabilistically decreases. Further, it is also possible to use the same value of the contention window used for transmission of the first PRACH preamble.

Method 4-2: Method of Adjusting a Selection Gap of the Counter N Value

As described above, N is selected as an arbitrary integer value among values between 0 and a value (CW_p) of a contention window at the time point that performs the channel access procedure. In the method 4-2, when performing the channel access procedure according to the number of PRACH preamble transmissions of the UE, a gap for selecting an N value may be adjusted. For example, assuming that the N value between 0 and CW_p used when performing the channel access procedure for transmitting the first PRACH preamble by the UE is X, the UE may select the N value as an integer value between 0 and X when performing a channel access procedure for transmitting a second PRACH preamble. Accordingly, the UE decreases the channel access procedure gap for the second PRACH preamble. Further, it is also possible to use the same N value used for transmission of the first PRACH preamble.

Method 4-3: Method of Reducing the Length or Number of Sensing Slots Based on a Setup Value The method 4-3 is a method in which the UE reduces the number (or length) of sensing slots according to the number of multiple PRACH preamble transmissions based on a preset value or rule with higher layer signaling or control information. For example, when the base station instructs the UE to transmit multiple PRACH preambles, the UE may reduce the number (or length) of sensing slots by a multiple of X according to the number of PRACH preamble transmissions, and the multiple value may be included in higher layer signaling or control information and be configured by the base station to the UE. As another method, the base station may configure an offset value of the number (or length) of sensing slots to the UE. In other words, when the base station configures the offset value to X, the UE may reduce the number (or length) of sensing slots by X according to the number of PRACH preamble transmissions to perform a channel access procedure. The X value in the above two methods may be configured by the base station to the UE to one value using higher layer signaling or control information, may configure a value according to the number of PRACH preamble transmissions to a set (e.g., {X, Y, Z, T}), or may be configured to a predetermined rule (e.g., X, 2X, 3X, 4X) according to PRACH preamble transmission. Further, the method 3 may be applied to the type1 or type2 channel access procedure.

Method 4-4: Method of Reducing a Random Value-Based Sensing Slot Length

The method 4-4 is a method in which the UE randomly selects a multiple or offset X value in the method 4-3 from a candidate group set by the base station. For example, when the base station instructs a set (e.g., {a, b, c, d}) of a multiple or offset value to the UE with higher layer signaling or control information, the UE may randomly reduce a value within a preset set by the number (or length) of sensing slots when transmitting the PRACH. In this case, the UE may extract a value when transmitting each PRACH preamble or apply the same value when transmitting each PRACH preamble after extracting once.

Embodiment 5

In the present embodiment, in an base station and UE operating in an unlicensed band, a method in which the base station instructs the UE to transmit multiple PRACH preambles is proposed.

Method 5-1: Instruct Multiple PRACH Preamble Transmission Using Higher Layer Signaling In order to transmit multiple PRACH preambles in an unlicensed band, it is necessary to configure a gap for performing a channel access procedure in addition to the existing PRACH occasion setup. To this end, the base station may instruct the UE to transmit multiple PRACH preambles with higher layer signaling. More specifically, the base station may instruct the UE to transmit multiple PRACH preambles by separate multiple PRACH configurations. For example, when a setup value is absent or disabled (or a specific bit value, for example, 0), the UE performs the existing PRACH preamble transmission. When the setup value is enabled (or a specific bit value, for example, 1), the UE may perform a channel access procedure between every PRACH occasion and perform multiple PRACH preamble transmission. In this case, the base station may indicate a channel access procedure execution period (e.g., the X number of OFDM symbols) between each PRACH occasion with separate higher layer signaling, or may determine multiple PRACH configurations, as illustrated in Table 4.

TABLE 4

| Multiple PRACH configuration | Contents |
|---|---|
| 'absent' | Existing PRACH preamble transmission method |

TABLE 4-continued

| Multiple PRACH configuration | Contents |
|---|---|
| Specific value (e.g, 0) or 1 OFDM (or Y us) | Multiple PRACH preamble transmission, channel access procedure gap = 1 OFDM symbol (or Y us) |
| Specific value (e.g., 1) or 2 OFDM (or Z us) | Multiple PRACH preamble transmission, channel access procedure gap = 2 OFDM symbol (or Z us) |

As another method, by adding Y bits to an existing PRACH configuration index, the base station may instruct multiple PRACH preamble transmission. For example, when a last Y or first Y bit of the PRACH configuration index is a specific value (e.g., all 0), the UE performs the existing PRACH preamble transmission, and when a last Y or first Y bit of the PRACH configuration index is another specific value (e.g., all 1), the UE may perform a channel access procedure between every PRACH occasion and perform multiple PRACH preamble transmission. In this case, the base station may indicate a channel access procedure execution period (e.g., X OFDM symbol length) between each PRACH occasion with separate higher layer signaling or may determine a last Y or first Y bit in the PRACH configuration index, as illustrated in Table 2. As another method, a PRACH configuration index for multiple PRACH preamble transmission may be additionally introduced. For example, PRACH configuration indices 0 to 255 may be used for configuring an existing PRACH occasion, and 256 to X (e.g., X=511) may be newly defined for multiple PRACH preamble transmission and PRACH occasion setup for the multiple PRACH preamble transmission. Here, the PRACH occasion may be variously considered by reflecting a channel access procedure gap, a preamble format, or a PRACH occasion.

Method 5-2: Instruct Multiple PRACH Preamble Transmission Using DCI

The base station may instruct the UE to transmit multiple PRACH preambles using DCI. In this case, the base station may indicate a gap (e.g., the number X of OFDM symbols) for multiple PRACH preamble transmission or channel access procedure to the UE through bit signaling. In DCI, when the multiple PRACH preamble transmission indicator is empty or indicates a specific value (e.g., 0), the UE performs an existing PRACH preamble transmission scheme. When the multiple PRACH preamble transmission indicator of the DCI indicates another specific value (e.g., 1), the UE sets a gap (e.g., OFDM symbol X) for performing a channel access procedure between every preset PRACH occasion with higher layer signaling. The gap (e.g., OFDM symbol X) for performing the channel access procedure may be configured using a separate indicator in DCI, or may indicate the number of symbols with a value of the PRACH preamble transmission indicator, as illustrated in Table 5.

TABLE 5

| Multiple PRACH preamble transmission indicator (bit) | Contents |
|---|---|
| 00 (or absent) | Basic operation |
| 01 | Multiple PRACH preamble transmission, channel access procedure gap = 1 OFDM symbol (or Y us) |
| 10 | Multiple PRACH preamble transmission, channel access procedure gap = 2 OFDM symbol (or Z us) |
| 11 | Reserved |

The above-described first to fifth embodiments are for convenience of description, and each embodiment or methods proposed in each embodiment may be implemented in combination.

Figure 10:
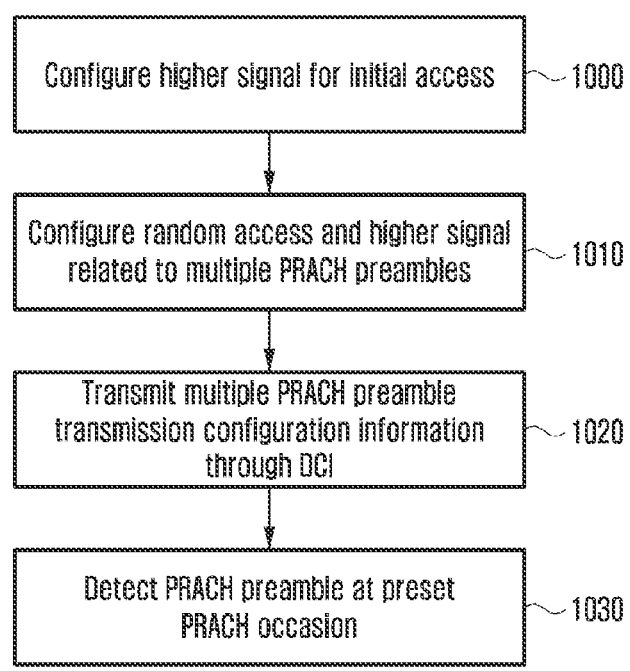
FIG. 10 is a flowchart illustrating an operation of a base station according to various embodiments of the disclosure.

An operation of an base station according to an embodiment of the disclosure will be described with reference to FIG. 10 as follows.

The base station may transmit higher signal setup for initial access and a synchronization signal to the UE in step 1000. For example, signals such as a PSS, SSS, or PBCH may be transmitted to the UE, and a PDCCH resource region for initial access or CORESET setup, search space configuration information, and the like may be transmitted to the UE through a higher signal. In step 1010, the base station may additionally transmit higher signal configuration, such as a random access-related PRACH configuration index, a frequency domain resource, RAR window configuration information, and transmission power configuration information, to the UE. Further, the base station may transmit higher signal configuration related to multiple PRACH preamble transmission to the UE. For example, in the first to fifth embodiments, information to be configured to the UE for multiple PRACH transmission may be transmitted to the UE through a higher signal. A detailed description thereof refers to information set with a higher signal in each embodiment. In step 1020, the base station may transmit multiple PRACH preamble transmission configuration information to the UE using DCI. When the PRACH transmission configuration information is transmitted with a higher signal, step 1020 may be omitted. In step 1030, the base station may detect a PRACH preamble at a PRACH occasion set to the UE. For example, according to at least one of the methods described in the first to fifth embodiments, the UE may transmit a PRACH preamble, and the base station may detect the PRACH preamble. Subsequent operations refer to the random access procedure of FIG. 5.

Figure 11:
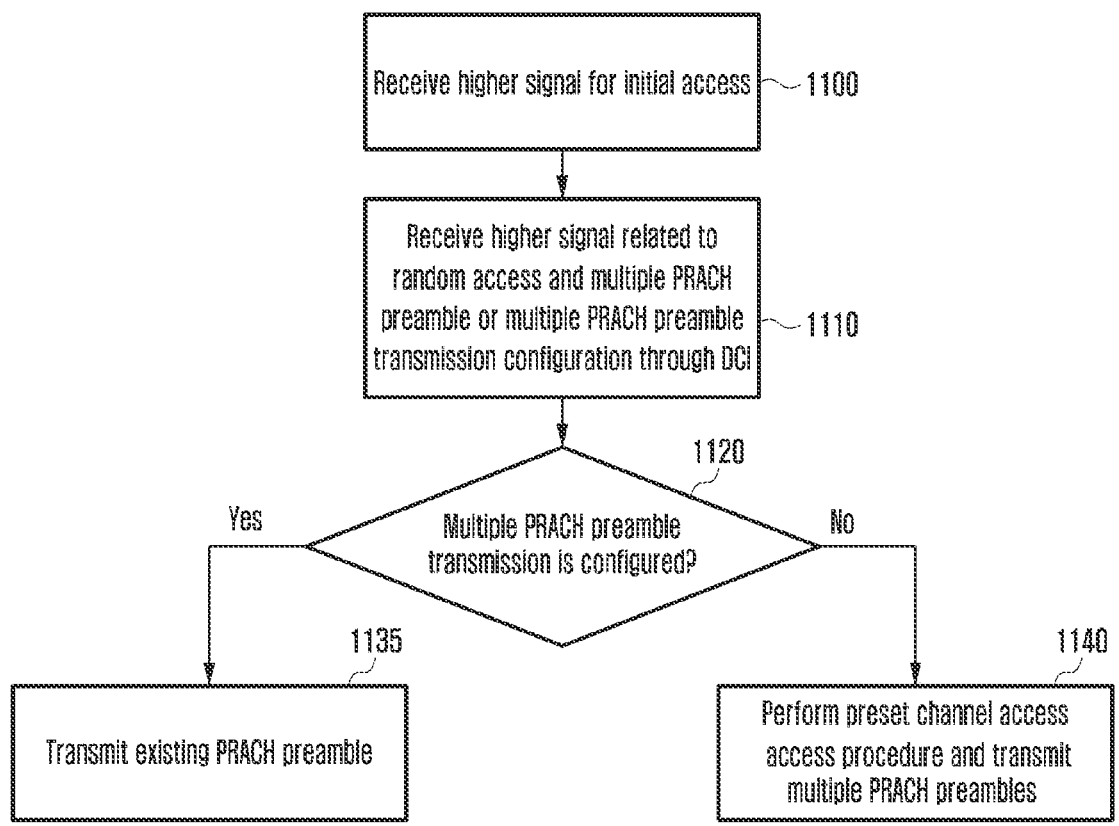
FIG. 11 is a flowchart illustrating an operation of a UE according to various embodiments of the disclosure.

A UE operation according to an embodiment of the disclosure will be described with reference to FIG. 11 as follows.

In step 1100, the UE establishes synchronization with the base station using a synchronization signal, and receives configuration for initial access from the base station through a higher signal. PDCCH and PDSCH transmission/reception are configured according to the received configuration information. For example, the UE may receive a downlink PDCCH resource region or CORESET configuration, a search space configuration, and the like from the base station through a higher signal.

In step 1110, the UE may receive a higher signal related to random access and multiple PRACH preamble transmission from the base station. In this case, the UE may receive a higher signal related to multiple PRACH preamble transmission using DCI. For example, in the first to fifth embodiments, information to be configured to the UE for multiple PRACH transmission may be transmitted to the UE through a higher signal. A detailed description thereof refers to information set with a higher signal in each embodiment.

If multiple PRACH preamble transmission is not configured in step 1120, the UE performs PRACH preamble transmission according to an existing method in step 1130.

If multiple PRACH preamble transmission is configured in step 1120, the UE performs a channel access procedure configured by the base station and performs multiple PRACH preamble transmission in step 1140. For example, the UE may transmit a PRACH preamble and the base station may detect the PRACH preamble according to at least one of the methods described in the first to fifth embodiments. Subsequent operations refer to the random access procedure of FIG. 5.

Figure 12:
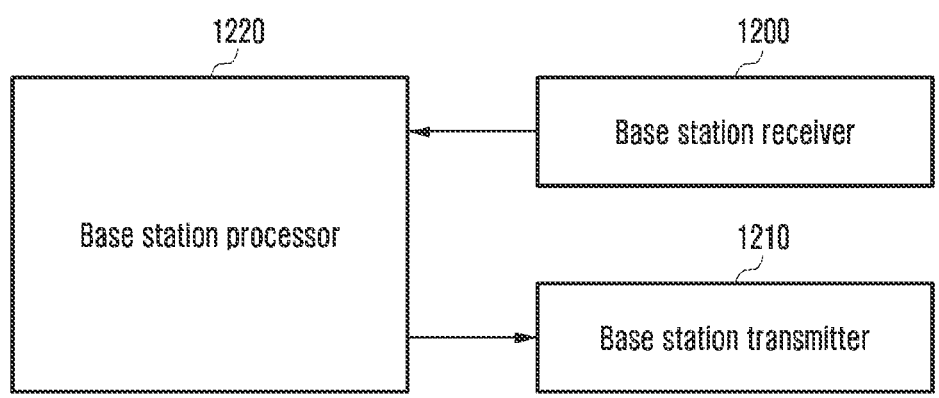
FIG. 12 is a diagram illustrating a configuration of a base station according to various embodiments of the disclosure.

FIG. 12 is a diagram illustrating a configuration of an base station according to an embodiment of the disclosure.

As illustrated in FIG. 12, the base station of the disclosure may include an base station receiver 1200, an base station transmitter 1210, and an base station processor 1220. The base station receiver 1200 and the base station transmitter 1210 may be collectively referred to as a transceiver in an embodiment of the disclosure. The transceiver may transmit and receive signals to and from the UE. The signal may include control information and data. To this end, the transceiver may include an RF transmitter that up-converts and amplifies a frequency of a transmitted signal, and an RF receiver that amplifies a received signal with low noise and that down-converts a frequency thereof. Further, the transceiver may receive a signal through a wireless channel, output the signal to the base station processor 1220, and transmit the signal output from the UE processor 1220 through the wireless channel. The base station processor 1220 may control a series of processes so that the base station may operate according to the above-described embodiment of the disclosure. For example, the base station receiver 1200 may receive a data signal including a control signal transmitted from the UE and a preamble signal for initial access, and the base station processor 1220 may determine the reception result of a control signal and a data signal or a preamble signal transmitted by the UE. For another example, the base station processor 1220 may perform a channel access procedure for an unlicensed band. For a specific example, the base station receiver 1200 may receive signals transmitted in the unlicensed band, and the base station processor 1220 may compare the strength of the received signal with a threshold value defined in advance or determined by a value of a function that takes a bandwidth as a factor to determine whether the unlicensed band is in an idle state. For example, the base station processor 1220 may control to transmit configuration information for transmission of multiple random access preambles to the UE, to receive a first random access preamble from the UE based on the configuration information for transmission of the multiple random access preambles, and to receive a second random access preamble from the UE. In this case, at least one of a length of a channel access procedure gap for the second random access preamble or a length of a random access channel transmission interval may be adjusted based on transmission of the first random access preamble. Adjusting the length of the random access channel transmission interval includes adjusting a length of a cyclic prefix (CP) related to the second random access preamble, and the base station processor 1220 may configure at least one of a first parameter indicating a multiple for adjusting a length of the CP to the UE or a second parameter indicating offset. Adjusting the length of the channel access procedure gap includes adjusting contention window related information or a sensing slot, and the base station processor 1220 may configure at least one of a contention window value, a counter N value, a size of the sensing slot, or a length of the sensing slot to the UE. Further, the base station processor 1220 may provide information indicating a symbol length of the channel access procedure gap and transmission of the multiple random access preambles to the UE, and the multiple random access preambles may be received in an unlicensed band.

The base station processor 1220 may be defined to a controller and include at least one processor.

Figure 13:
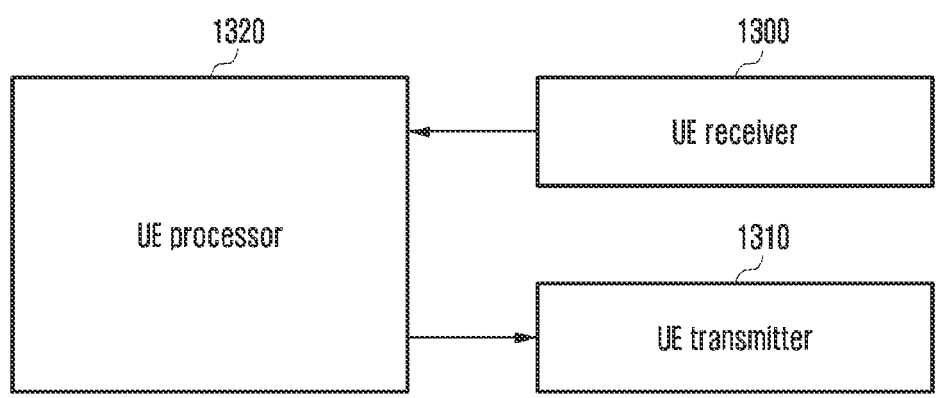
FIG. 13 is a diagram illustrating a configuration of a UE according to various embodiments of the disclosure.

FIG. 13 is a diagram illustrating a configuration of a UE according to an embodiment of the disclosure.

As illustrated in FIG. 13, the UE of the disclosure may include a UE receiver 1300, a UE transmitter 1310, and a UE processor 1320. The UE receiver 1300 and the UE transmitter 1310 may be collectively referred to as a transceiver in an embodiment of the disclosure. The transceiver may transmit and receive signals to and from the base station. The signal may include control information, data, and a preamble. To this end, the transceiver may include an RF transmitter that up-converts and amplifies a frequency of a transmitted signal, and an RF receiver that amplifies a received signal with low noise and that down-converts a frequency thereof. Further, the transceiver may receive a signal through a wireless channel, output the signal to the UE processor 1320, and transmit a signal output from the UE processor 1320 through a wireless channel. The UE processor 1320 may control a series of processes so that the UE may operate according to the above-described embodiment of the disclosure. For example, the UE receiver 1300 may receive a data signal including a control signal, and the UE processor 1320 may determine a reception result of the data signal. Thereafter, when the first signal reception result including the data reception should be transmitted to the base station at the timing, the UE transmitter 1310 transmits the first signal reception result to the base station at the timing determined by the processor. For another example, when the UE receiver 1300 receives information on multiple PRACH preamble transmission from the base station, the UE processor 1320 may reset or change a channel access procedure gap or a CP length of the PRACH preamble according to the number of PRACH transmissions of the UE; thus, the UE transmitter 1310 may transmit the PRACH preamble. The UE processor 1320 may control to receive configuration information for transmission of multiple random access preambles from the base station, transmit a first random access preamble based on the configuration information for transmission of the multiple random access preambles, to adjust at least one of a length of a channel access procedure gap or a length of a random access channel transmission interval for a second random access preamble based on transmission of the first random access preamble, and to attempt channel access for the second random access preamble transmission in the channel access procedure gap based on adjustment of at least one of the length of the channel access procedure gap or the length of the random access channel transmission interval. Adjusting the length of the random access channel transmission interval includes adjusting a length of a cyclic prefix (CP) related to the second random access preamble, and at least one of a first parameter indicating a multiple for adjusting the length of the CP from the base station or a second parameter indicating the offset may be configured. Adjusting the length of the channel access procedure gap includes adjusting contention window related information or a sensing slot, and at least one of a contention window value, a counter N value, a size of the sensing slot, or a length of the sensing slot may be configured by the base station. The UE processor 1320 may control to obtain information indicating transmission of the multiple random access preambles and a symbol length of the channel access procedure gap from the base station, and to transmit the multiple random access preambles in an unlicensed band.

The UE processor 1320 may be defined to a controller and include at least one processor.

The embodiments of the disclosure disclosed in the present specification and drawings are only provided for specific examples to easily describe the technical content of the disclosure and to help understanding of the disclosure, and are not intended to limit the scope of the disclosure. That is, it is apparent to those of ordinary skill in the art that other modifications based on the technical idea of the disclosure can be implemented. Further, each of the above embodiments may be combined and operated as necessary. For example, some of the methods proposed in the disclosure may be combined with each other to operate an base station and a UE. Further, although the above embodiments have been presented based on 5G and NR systems, other modifications based on the technical idea of the above embodiment may be implemented in other systems such as LTE, LTE-A, and LTE-A-Pro systems.

The invention claimed is:

1. A method performed by a terminal, the method comprising:
   receiving configuration information for transmission of multiple random access preambles from a base station;
   transmitting a first random access preamble based on the configuration information for transmission of the multiple random access preambles;
   adjusting at least one of a length of a channel access procedure gap for a second random access preamble or a length of a random access channel transmission interval based on transmission of the first random access preamble; and
   attempting channel access for transmission of the second random access preamble in the channel access procedure gap based on adjustment of at least one of the length of the channel access procedure gap or the length of the random access channel transmission interval.

2. The method of claim 1, wherein adjusting the length of the random access channel transmission interval includes adjusting a length of a cyclic prefix (CP) related to the second random access preamble, and
   wherein at least one of a first parameter indicating a multiple for adjusting the length of the CP or a second parameter indicating offset is configured by the base station.

3. The method of claim 1, wherein adjusting the length of the channel access procedure gap includes adjusting contention window related information or a sensing slot, and
   wherein at least one of a contention window value, a counter N value, a size of the sensing slot, or a length of the sensing slot is configured by the base station.

4. The method of claim 1,
   wherein information indicating transmission of the multiple random access preambles and a symbol length of the channel access procedure gap is obtained from the base station, and
   wherein the multiple random access preambles are transmitted in an unlicensed band.

5. A terminal, comprising:
   a transceiver; and
   a controller configured to:
   receive configuration information for transmission of multiple random access preambles from a base station through the transceiver,
   transmit a first random access preamble based on the configuration information for transmission of the multiple random access preambles through the transceiver,
   adjust at least one of a length of a channel access procedure gap or a length of a random access channel transmission interval for a second random access preamble based on transmission of the first random access preamble, and
   attempt channel access for transmission of the second random access preamble in the channel access procedure gap based on adjustment of at least one of the length of the channel access procedure gap or the length of the random access channel transmission interval.

6. The terminal of claim 5, wherein adjusting the length of the random access channel transmission interval includes adjusting the length of a cyclic prefix (CP) related to the second random access preamble, and
   wherein at least one of a first parameter indicating a multiple for adjusting the length of the CP or a second parameter indicating offset is configured by the base station.

7. The terminal of claim 5, wherein adjusting the length of the channel access procedure gap includes adjusting contention window related information or a sensing slot, and
   wherein at least one of a contention window value, a counter N value, a size of the sensing slot, or a length of the sensing slot is configured by the base station.

8. The terminal of claim 5, wherein information indicating transmission of the multiple random access preambles and a symbol length of the channel access procedure gap is obtained from the base station, and
   wherein the multiple random access preambles are transmitted in an unlicensed band.

9. A method performed by a base station, the method comprising:
   transmitting configuration information for transmission of multiple random access preambles to a terminal;
   receiving a first random access preamble from the terminal based on the configuration information for transmission of the multiple random access preambles; and
   receiving a second random access preamble from the terminal,
   wherein at least one of a length of a channel access procedure gap or a length of a random access channel transmission interval for the second random access preamble is adjusted based on transmission of the first random access preamble.

10. The method of claim 9, wherein adjusting the length of the random access channel transmission interval includes adjusting a length of a cyclic prefix (CP) related to the second random access preamble, and
    wherein at least one of a first parameter indicating a multiple for adjusting the length of the CP or a second parameter indicating offset is configured to the terminal.

11. The method of claim 9, wherein adjusting the length of the channel access procedure gap includes adjusting contention window related information or a sensing slot, and
    wherein at least one of a contention window value, a counter N value, a size of the sensing slot, or a length of the sensing slot is configured to the terminal.

12. The method of claim 9, wherein information indicating transmission of the multiple random access preambles and a symbol length of the channel access procedure gap is provided to the terminal, and
    wherein the multiple random access preambles are received in an unlicensed band.

13. A base station, comprising:
a transceiver; and
a controller configured to:
transmit configuration information for transmission of multiple random access preambles to a terminal through the transceiver,
receive a first random access preamble from the terminal through the transceiver based on the configuration information for transmission of the multiple random access preambles, and
receive a second random access preamble from the terminal through the transceiver,
wherein at least one of a length of a channel access procedure gap or a length of a random access channel transmission interval for the second random access preamble is adjusted based on transmission of the first random access preamble.

14. The base station of claim 13, wherein adjusting the length of the random access channel transmission interval includes adjusting a length of a cyclic prefix (CP) related to the second random access preamble, and
    wherein at least one of a first parameter indicating a multiple for adjusting the length of the CP or a second parameter indicating offset is configured to the terminal.

15. The base station of claim 13, wherein adjusting the length of the channel access procedure gap includes adjusting contention window related information or a sensing slot,
    wherein at least one of a contention window value, a counter N value, a size of the sensing slot, or a length of the sensing slot is configured to the terminal,
    wherein information indicating transmission of the multiple random access preambles and a symbol length of the channel access procedure gap is provided to the terminal, and
    wherein the multiple random access preambles are received in an unlicensed band.

* * * * *